United States Patent [19]

Chichester

[11] Patent Number: 4,573,319
[45] Date of Patent: Mar. 4, 1986

[54] VEHICLE HYDRAULIC SYSTEM WITH SINGLE PUMP

[75] Inventor: Willard L. Chichester, Battle Creek, Mich.

[73] Assignee: Clark Equipment Company, Buchanan, Mich.

[21] Appl. No.: 400,769

[22] Filed: Jul. 22, 1982

Related U.S. Application Data

[63] Continuation of Ser. No. 291,653, Aug. 10, 1981, abandoned.

[51] Int. Cl.⁴ .............................................. F16D 31/02
[52] U.S. Cl. ........................................ 60/422; 60/423; 60/427; 91/516
[58] Field of Search ................. 60/422, 423, 427, 431; 91/516, 532, 451, 6, 31; 180/132; 137/110; 251/26

[56] References Cited

U.S. PATENT DOCUMENTS

| | | | |
|---|---|---|---|
| 3,568,868 | 3/1971 | Chichester | 137/101 X |
| 3,643,682 | 2/1972 | Chmura | 251/26 X |
| 3,704,800 | 12/1972 | Redelman | 91/532 X |
| 3,875,747 | 4/1975 | Briggs | 60/422 X |
| 3,916,767 | 11/1975 | Barton | 60/484 X |
| 3,964,260 | 6/1976 | Williams et al. | 60/413 |
| 4,005,636 | 2/1977 | Dunn | 91/31 |
| 4,070,857 | 1/1978 | Wible | 60/431 X |
| 4,144,946 | 3/1979 | Melocik | 180/132 |
| 4,341,149 | 7/1982 | Dezelan | 91/445 X |

Primary Examiner—Edward K. Look
Attorney, Agent, or Firm—Reising, Ethington, Barnard, Perry & Milton

[57] ABSTRACT

A hydraulic system is disclosed for energizing the power steering and various work handling hydraulic load circuits of a lift truck. A single positive displacement pump supplies the requirements of the plural load circuits and is driven by a changeable speed prime mover. Manually actuable selector means are operatively connected with the load circuits and speed control means are provided for the prime mover. A priority demand valve is connected between the pump and the respective load circuits. When only the power steering circuit is selected, the prime mover is operated in a low speed range and the priority demand valve supplies the required flow to the power steering circuit. When the lift circuit is selected, the prime mover is operated in a high speed range and the priority demand valve supplies the flow requirements to the power steering circuit and to the lift circuit. When an auxiliary work handling circuit is selected, the prime mover is operated in an intermediate speed range and the flow requirements of the power steering circuit and the auxiliary load handling circuit are supplied. The prime mover may be either an electric motor or an internal combustion engine.

24 Claims, 19 Drawing Figures

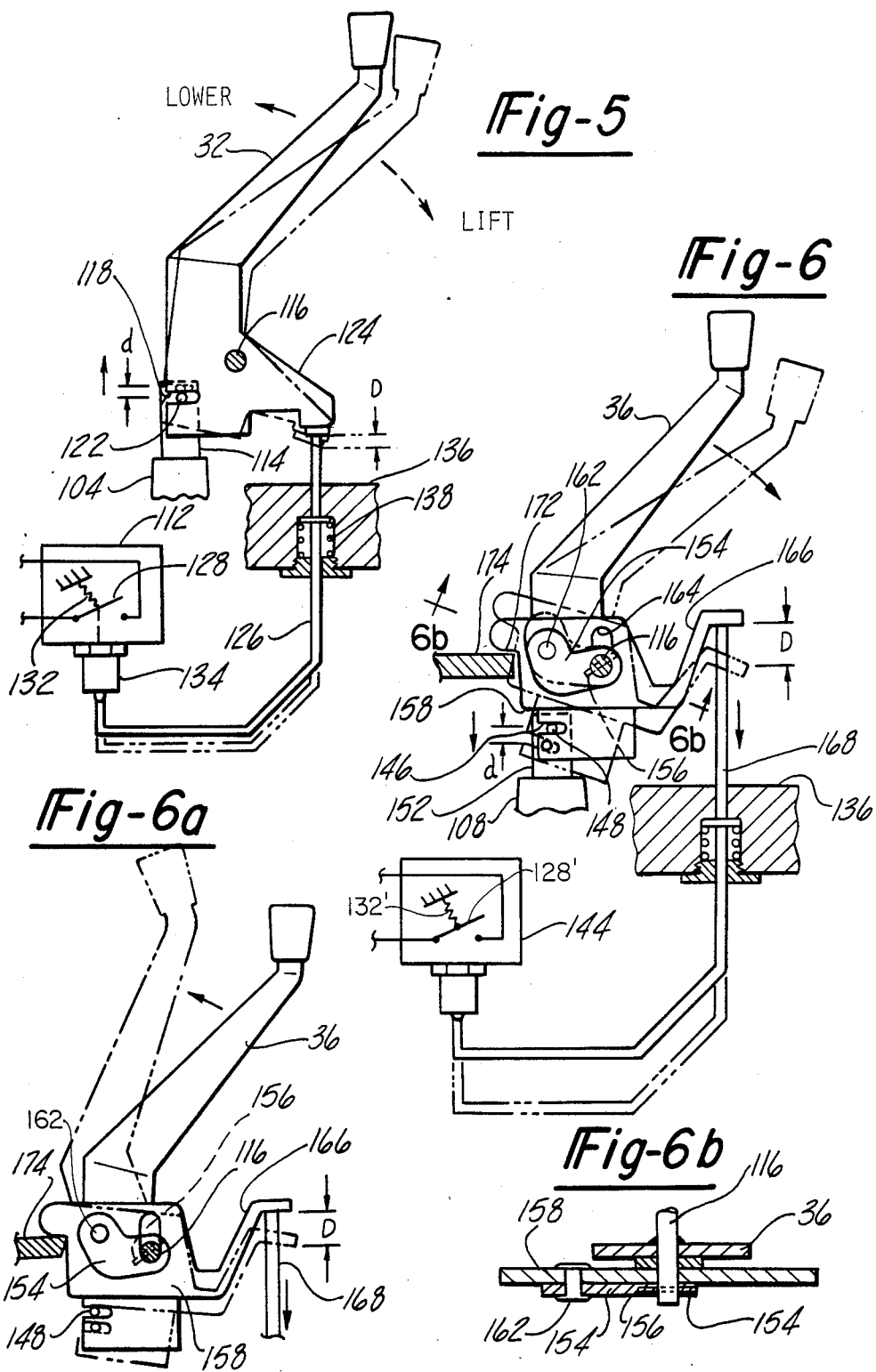

VEHICLE HYDRAULIC SYSTEM WITH SINGLE PUMP

This is a continuation of pending application Ser. No. 291,653, filed Aug. 10, 1981, now abandoned.

FIELD OF THE INVENTION

This invention relates to work vehicles such as lift trucks; more particularly, it relates to an improved hydraulic system for selectively energizing the hydraulic work circuits such as the vehicle power steering circuit and the load handling power actuator circuits.

BACKGROUND OF THE INVENTION

It has been a common practice to provide lift trucks with two or more hydraulic pumps for supplying the different hydraulic circuits required for the various load handling and vehicle operating functions. For example, one pump having a relatively high flow capacity is used for supplying the load handling actuator circuits, such as the lift and tilt circuits for the extendable upright. A smaller pump is provided to supply the hydraulic circuit of the vehicle power steering. It is also a known practice to provide additional pumps for other hydraulic circuits on the vehicle. In some instances, two or more pumps are connected in separate and independent hydraulic circuits and in other instances, the pumps are connected in common circuits. Typically, in a lift truck, the flow and pressure requirements of the power steering circuit are much lower than the requirements of the lift circuit. When the requirements of the various hydraulic circuits are met by using plural pumps, the pumps must be sized according to the maximum flow requirements of the respective circuits. Each additional pump and its attendant drive arrrangement, hydraulic and electrical circuit components requires additional space and adds considerable weight to the vehicle. Accordingly, it is desirable to eliminate the need for plural hydraulic pumps and the duplication of circuit components in the hydraulic system of a work vehicle.

It has not been practical to use a single pump such as the large pump required for the lift circuit, which may have a by-pass pressure of 3000 PSI, for supplying the power steering circuit which needs only five gallons per minute at 1000 PSI. Certain load handling circuits such as a tilt circuit for the upright and an auxiliary circuit for a side shifter may be operated from the large pump of the lift circuit because each use is of short duration. However, other load handling circuits such as auxiliary circuits for clamps and rotators are not desirably supplied from the pump for the lift circuit because such devices are used frequently and for prolonged periods.

In the prior art, a lift truck is known in which a single pump supplies hydraulic fluid for both the lift circuit and for the power steering circuit. In this system, the outlet of the pump is supplied through a priority valve or flow divider to both the lift circuit and the power steering circuit which are both returned to the sump. The priority valve functions to allocate, on a priority basis, a rated value of flow to the power steering circuit, the rated value corresponding to the maximum flow required for operation of the power steering circuit. The pump flow which exceeds the rated value for power steering is supplied by the priority valve to the lift circuit. The power steering circuit is provided with relatively low pressure relief and the lift circuit is provided with a separate, and relatively high, pressure relief. In this system, the flow allocated to the power steering system is wasted except to the extent that it is used in power steering since the entire rated maximum flow for power steering is returned to sump whether it is used or not. This requires a pump which is sized to deliver the maximum rated flow of the lift circuit plus the maximum rated flow of the power steering circuit. Consequently, there is a considerable amount of unused capacity and wasted power since the power steering circuit is continuously supplied with its rated flow but power steering is used only part time and the full rated flow is very seldom required.

In my prior U.S. Pat. No. 3,568,868 a single pump supplies fluid to both the tilt circuit and the lift circuit of the extendable upright. For this purpose, a flow priority valve is connected between the outlet of the pump and the inlet ports of the tilt and lift control valves so that the flow requirement of the tilt actuators is always supplied. A one way valve connects the tilt circuit to the lift circuit so that the entire flow from the pump can be supplied to the lift circuit. In this arrangement, a 48 volt battery may be substituted for a 32 volt battery without adverse consequence even with increased pump output because the flow priority valve regulates the flow to the tilt actuators and the excess flow is directed to the lift circuit.

In the Williams et al U.S. Pat. No. 3,964,260, a single hydraulic pump is utilized to supply fluid to the power steering circuit and also to the lift and tilt circuits of the extendable upright. The pump has sufficient capacity to meet the maximum flow requirements and any excess fluid is diverted to an accumulator. The steering circuit is connected to the accumulator so that sufficent flow will be available in the event of need for emergency steering.

A general object of this invention is to provide an improved hydraulic system for energizing the power steering and load handling hydraulic circuits of a work vehicle.

SUMMARY OF THE INVENTION

According to this invention, a hydraulic system for a work vehicle is provided in which a single pump supplies at least two load circuits. A priority demand valve is provided which gives one of the load circuits priority over the other in receiving its required fluid flow; the priority demand valve allocates to the priority circuit only that amount of flow required by it and passes the remainder of the flow to the other load circuit or circuits. The rated flow and the rated pressure are established independently for each of the load circuits.

Further, according to this invention, the priority demand valve has an inlet port connected with the pump, a primary outlet port connected with the first load circuit, a secondary outlet port connected with the second load circuit, and normally closed valve means between the inlet port and the outlet port. It includes flow rate responsive means urging the valve means toward opening in response to inlet flow and pressure responsive means for urging the valve means toward opening when the pressure in the first load circuit exceeds a predetermined value. The valve means is opened in response to the inlet flow or the pressure in the first load circuit or a combination thereof. As a result, the priority demand valve operates so that the flow required by the first load circuit is given priority and the inlet flow in excess of that required by the first load circuit is supplied to the second load circuit. Further, bypass means are provided to permit flow from the primary outlet to the second load circuit when there is excess flow and the pressure in the second load circuit is less than the pressure in the first load circuit.

Further, in accordance with this invention, a work vehicle having at least first and second hydraulic load circuits is provided with a positive displacement pump for supplying the hydraulic flow requirements of the load circuits. First and second manually actuable selector means are operatively connected with the first and second load circuits respectively. The pump is driven by a changeable speed prime mover and speed control means is operatively coupled therewith for selectively causing it to operate in a speed range between a low speed and a high speed. The pump is adapted to supply the hydraulic flow required by the second load circuit when the prime mover is operated in the high speed range and to supply the flow required by the first circuit when the prime mover is operated at the low speed range. A priority demand valve has an inlet port connected with the outlet of the pump. It has primary and secondary outlet ports connected with the respective inlets of the first and second circuits. A normally closed valve means is connected between the inlet port and the secondary outlet port. The selector means are actuated either separately or together to select operation of one or both load circuits at a time. The priority demand valve includes means for supplying to the primary outlet port all of the flow required by the first load circuit when the selector means are actuated individually or together with the pump running at any speed in the speed range. The priority demand valve also includes means for opening the valve means when the inlet flow exceeds that required by the first load circuit with the first and second selector means actuated together and with the pump running at any speed within the speed range. In this arrangement, the inlet flow in excess of that required by the first load circuit is supplied to the secondary outlet port and thence to the second load circuit. Preferably, the prime mover is operated in the low speed range when only the first selector means is actuated and is operated in the high speed range when only the second selector means is actuated and when both selector means are actuated together.

Further, according to the invention, the vehicle may be provided with three hydraulic load circuits, with a third manually actuable selector means operatively coupled with the third load circuit. The third circuit has a hydraulic flow requirement intermediate that of the first and second circuits. The manually actuable speed control means is operatively coupled with the prime mover for selectively causing it to operate in an intermediate speed range when the third manually actuable selector is actuated. The pump is adapted to supply the hydraulic flow required by the third circuit when the prime mover is operated in the intermediate speed range. The priority demand valve has its secondary outlet port connected with the inlet of the third load circuit. The first, second or third selector means are actuated either separately or together in accordance with the desired functions. Preferably, the prime mover is operated in the low speed range when only the first selector means is actuated. It is operated in the intermediate speed range when only the third selector means is actuated and when the first and third selector means are actuated together. It is operated in the high speed range when only the second selector means is actuated and when the second selector means is actuated together with one of the other selector means.

The invention is especially applicable to a lift truck wherein the first, second and third load circuits respectively, are the power steering circuit, lift circuit and auxiliary circuit of the vehicle.

Further, in accordance with the invention, the prime mover is an electric motor and the speed control means is operatively coupled with the selector means for actuation concomitantly therewith.

Further, according to the invention, the prime mover is an internal combustion engine and the speed control means comprises a manually actuated throttle of the engine.

A more complete understanding of this invention may be obtained from the description that follows taken with the accompanying drawings.

DESCRIPTION OF THE DRAWINGS

FIG. 5 taken on line 5—5 of FIG. 2, shows the lift control lever and associated speed selector switch;

FIG. 6 taken on line 6—6 of FIG. 2, shows the auxiliary control lever and associated speed selector switch;

FIG. 6a shows the auxiliary control lever in an alternate position;

FIG. 6b is a view taken on lines 6b—6b in FIG. 6;

BEST MODE FOR CARRYING OUT THE INVENTION

General Description Of The System

Figure 1:
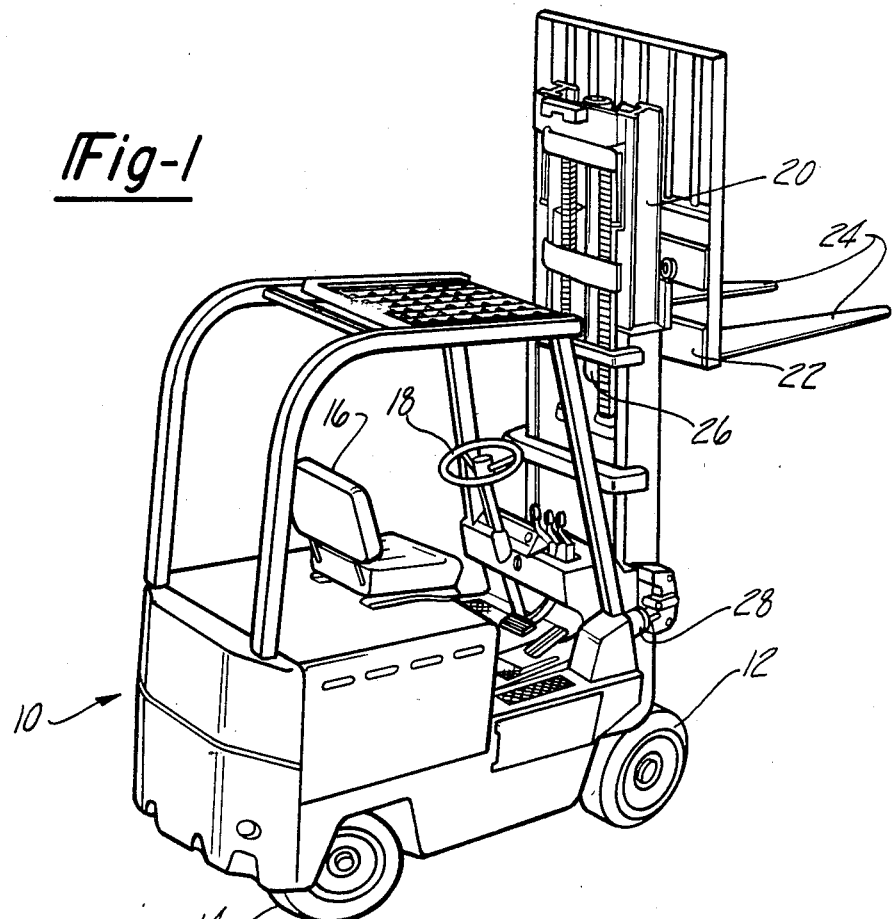
FIG. 1 is a perspective view of a lift truck embodying the subject invention.

Referring now to the drawings, there is shown an illustrative embodiment of the invention in the hydraulic system of a work vehicle, specifically a lift truck. It will be appreciated as the description proceeds, that the invention may be employed in other types of work vehicles and is useful in other applications.

Referring now to FIG. 1, there is depicted an electric lift truck 10 which is supported on a pair of traction wheels 12 and a pair of dirigible wheels 14 for direction control of the vehicle. The vehicle is provided with a driver's station including a driver's seat 16 and a steering wheel 18 which is coupled with the dirigible wheels 14 through an hydraulic power steering system which will be described subsequently. The lift truck includes an extendible upright 20 which is mounted on the vehicle frame and includes a carriage 22 with load engaging forks 24. The carriage 22 is movably mounted on the upright 20 and is raised or lowered by an hydraulic motor 26. The upright 20 is mounted adjacent its lower end on the vehicle frame for pivotal motion about a horizontal axis and is tilted in a forwardly or rearwardly direction by a pair of hydraulic motors 28. In addition, the lift truck may be provided with an auxiliary load handling device (not shown in FIG. 1), such as a side shifter, clamp or rotator.

Figure 2:
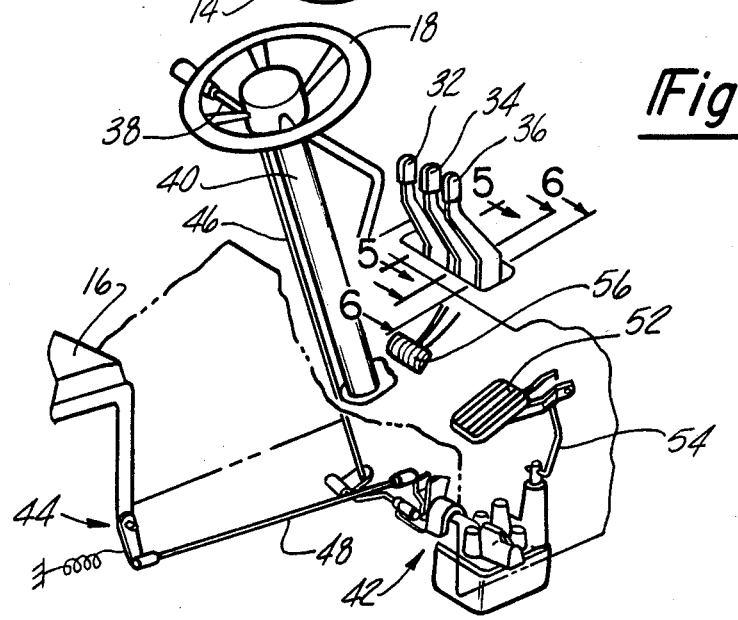
FIG. 2 is a perspective view of certain manual controls for use by the driver.
Figure 4:
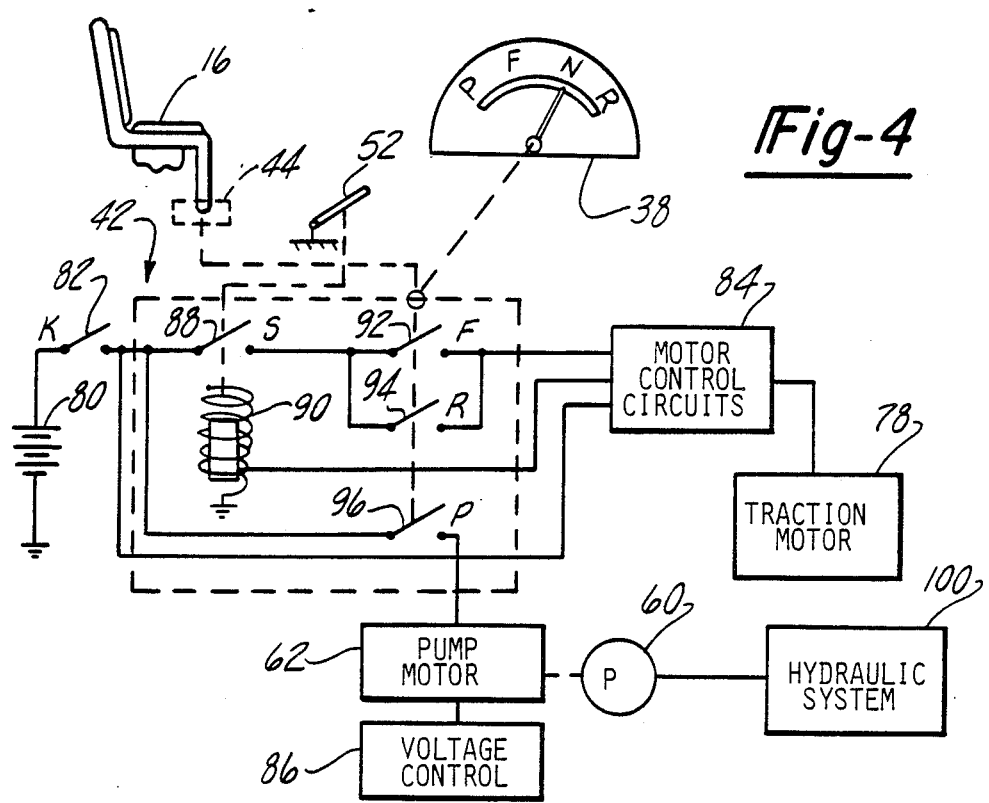
FIG. 4 is a diagram of the electrical system.

FIG. 2 depicts the lift truck with the manual controls accessable at the driver's station for driving the vehicle and operation of the load handling functions, including the movement of the carriage 22 and any auxiliary load handling device that may be added. The manual controls for the load handling functions include a lift control lever 32, a tilt control lever 34, and an auxiliary control lever 36. These control levers will be described in detail subsequently in relation to the control functions in the hydraulic system of this invention. A drive selector lever 38 is mounted on the steering column 40 and is coupled with a controller 42 which provides starting and speed control of the traction motor. The controller 42 is also adapted to control the parking brake (not shown in FIG. 2) in accordance with the state of a seat occupancy detector 44. The controller 42, per se, forms no part of the present invention; it does, however, control the actuation of certain switches which affect the operation of the hydraulic system. Suffice it to say, that the functions of the controller 42 are represented in the diagram of FIG. 4 which will be described presently. It is noted however, that the drive selector lever 38 is coupled by suitable linkage 46 with the controller 42 for the selection of neutral, forward, reverse or park modes of operation of the traction motor. Also, the seat occupancy detector 44 includes suitable linkage 48 coupled between the seat 16 and the controller 42. An accelerator pedal 52 is coupled through suitable linkage 54 to the controller 42 for starting and speed control of the traction motor. The driver's station additionally includes the foot brake pedal 56 for operation of a service brake (not shown in FIG. 2) for the vehicle.

Figure 3:
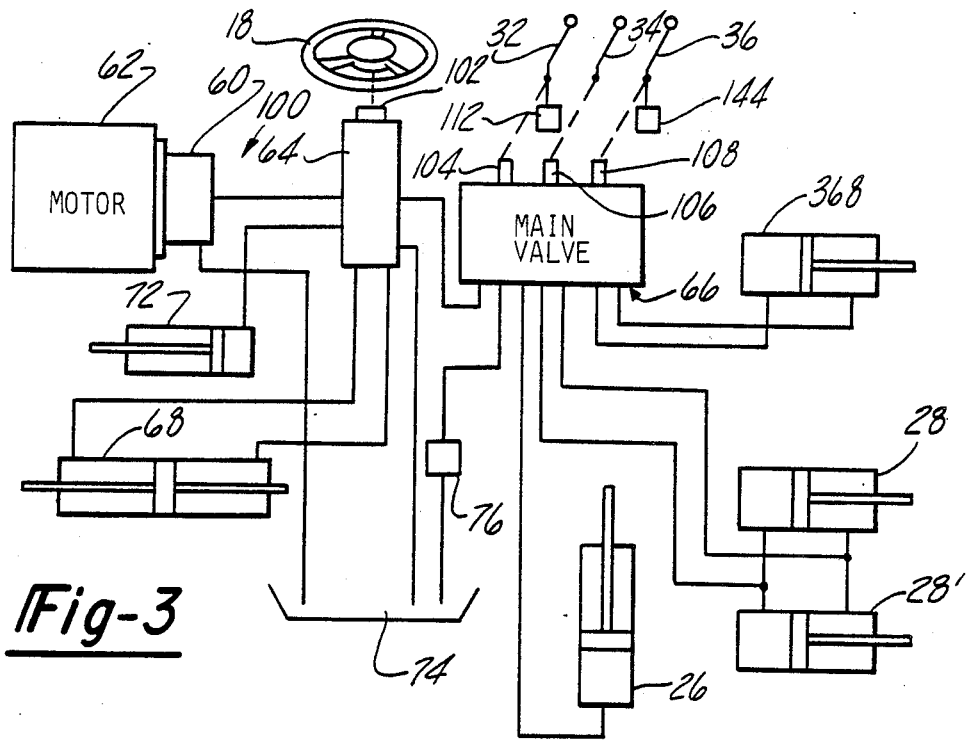
FIG. 3 is a block diagram of the hydraulic system of this invention.

FIG. 3 is a block diagram of the hydraulic system of this invention. The hydraulic system comprises a single hydraulic pump 60 of the positive displacement type. The prime mover for the pump is an electric motor 62 which is a DC series motor. The system further comprises a steering unit 64 and a main valve 66. Hydraulic fluid is supplied from the pump 60 to the steering unit 64 and through the steering unit to the main valve 66. The steering unit 64 includes a steering control valve (not shown in FIG. 3) which supplies fluid to the hydraulic motor or steering cylinder 68 for power steering. The steering unit also supplies fluid to the hydraulic motor or brake cylinder 72 for the parking brake and includes a return to a hydraulic reservoir or tank 74. The main valve 66 supplies fluid to the hydraulic motor or lift cylinder 26 for the carriage 22. The main valve 66 also supplies fluid to the hydraulic motors or tilt cylinders 28 and 28' for tilting the upright 20. Also, the main valve 66 supplies fluid to an auxiliary cylinder 368. Fluid from the main valve is returned to the tank 74 through a return line filter 76.

FIG. 4 depicts the electrical circuits, in block diagram, for energizing the drive motor 62 for the hydraulic pump 60 and for energizing the traction motor 78. It is noted that the voltage from the battery 80 is supplied through a key switch 82 to the controller 42 and thence directly to the pump motor 62. The energizing circuit for the pump motor 62 is completed through a voltage control circuit 86. The pump 60 is connected with the hydraulic system 100. The battery voltage is applied from the controller 42 through the motor control circuits 84 to the traction motor 78. The controller 42 includes switching circuits which are controlled by the drive selector 38, the seat occupancy detector 44 and the accelerator pedal 52 in a manner which will be described presently.

The controller 42, as shown in FIG. 4, includes a start switch 88 which is connected in series with the key switch 82 between the battery 80 and the motor control circuit 84. The start switch is actuated by movement of the accelerator pedal 52; the switch is open with the accelerator pedal in its retracted position and the switch is closed during an initial increments of movement when the accelerator pedal is depressed. A speed control member 90 of the inductive type is also coupled with the accelerator pedal 52 and a speed control signal is transmitted from the member 90 to the motor control circuits 84. Direction control for the traction motor 78 is provided by a forward control switch 92 and a reverse control switch 94. The forward and reverse control switches are connected in parallel with each other and in series with the start switch 88 between the battery and the motor control circuit. Thus, the traction motor 78 will be energized through the motor control circuits 84 when the key switch 82 and the start switch 88 are closed with either the forward control switch 92 or the reverse control switch 94 closed. The controller 42 also includes a pump control switch 96 which is serially connected with the key switch 82 between the battery 80 and the pump motor 62. Accordingly, when the pump control switch 96 is opened the pump motor 62 is turned off and the fluid to the hydraulic system 100 is cut off.

The forward control switch 92, reverse control switch 94, and the pump control switch 96 are selectively actuated by the drive selector lever 38 which may be placed in park position, forward position, neutral position or reverse position. When the drive selector lever is in the neutral position, as depicted in FIG. 4, both the forward switch 92 and the reverse switch 94 are open and hence, the traction motor is turned off. When the selector lever 38 is in the forward position, the forward switch 92 is closed and the reverse switch 94 is open and hence, the traction motor will be energized when the start switch 88 is closed. Similarly, when the selector member 38 is in the reverse position, the reverse control switch 94 is closed and the forward control switch 92 is open and hence, the motor will be energized when the start switch 88 is closed. When the selector member 38 is in the park position, the forward control switch 92 and the reverse control switch 94 are open and the pump control switch 96 is open. This turns off the traction motor 78 and the pump motor 62 and hence, fluid to the hydraulic system 100 is cut off.

The selective actuation of the forward control switch 92, reverse control switch 94 and the pump control switch 96 is also controlled by the seat occupancy detector 44. The occupancy detector is operative, when the selector lever 38 is in the neutral position to cause the pump control switch 96 to open and thereby turn off the pump motor 62 when the driver dismounts from the seat. Also, the detector 44 is operative, when the selector lever 38 is in either the forward or reverse position, in response to the driver dismounting from the seat, to cause the forward control switch 92 and the reverse control switch 94 to open and deenergize the traction motor and to cause the pump control switch 96 to open and deenergize the pump motor.

In summary, the electrical circuit of FIG. 4 as just described, is operative to deenergize the traction motor 78 unless the key switch 82, the start switch 88 and one of the forward or reverse control switches 92 and 94, respectively, are all closed. Also, it is operative to deenergize the pump motor 62 unless the key switch 82 and the pump switch 96 are both closed; the pump switch 96 is closed only when the driver's seat is occupied and when the drive selector lever 38 is in forward, reverse or neutral position. The pump switch 96 is open when the driver selector lever 38 is in the park position regardless of driver's seat occupancy. As a result of this control, hydraulic fluid to the hydraulic system 100 is cut off unless the driver occupies the seat and the drive selector lever is in forward, reverse or neutral.

The hydraulic system 100 of this invention, is subject to manual control in the selection of different work functions to be performed. The hydraulic system 100 includes the power steering circuit for the dirigible wheels 14 of the work vehicle, a power lift circuit for the work engaging carriage 22, a power tilt circuit for the upright 20 and a power actuation circuit for the auxiliary load handling device (not shown in FIG. 1 or 2). The manual control of the hydraulic system 100 is exercised by the steering wheel 18 for power steering and by the respective hand levers 32, 34 and 36 for the lift, tilt and auxiliary functions. For this purpose, the steering wheel 18 is coupled with the steering valve 102 (see FIG. 3) for bi-directional actuation of the valve in response to steering wheel motion. The lift control lever 32 is coupled with the lift valve 104 and the tilt control lever 34 is coupled with a tilt control valve 106. Similarly, the auxiliary control lever 36 is coupled with an auxiliary control valve 108. The control levers 32, 34 and 36 will be described in greater detail below.

Detailed Description Of The Control Levers

The lift control lever 32 is shown in FIG. 5. It is adapted to actuate the lift control valve 104 which is a part of the hydraulic system 100; it also is adapted to actuate a speed control switch 112 which is operatively connected with the hydraulic system 100 in a manner which will be described subsequently. The lift control valve 104 is preferably a spool valve of the open center type having an operating stem 114. The stem is axially movable in either direction from a neutral position to select either the lift mode or lower mode of operation. The lift valve 104 will be described in greater detail subsequently in connection with the hydraulic circuit 100. The control lever 32 is pivotally mounted on a shaft 116 for pivotal motion in the fore and aft directions by the vehicle driver. The lever 32 is provided with a slot 118 which receives a pin 122 extending through the operating stem 114 of the valve. Accordingly, when the control lever 32 is pivoted in the rearward direction (phantom lines) the stem 114 of the valve is raised from the neutral position and the valve is operated in the lift mode. When the hand lever 32 is rotated in the forward direction, the stem 114 is lowered and the valve is operated in the lower mode. For the purpose of actuating the switch 112, the control lever 32 is provided with an arm 124 which actuates a push rod 126. The switch 112 comprises switch contacts 128 which are biased by a spring 132 toward a closed position. A switch plunger 134 is adapted, when depressed, to hold the switch contacts 128 in the open position. The push rod 126 is mounted in the control lever housing 136 for reciprocal motion and is spring loaded by a bias spring 138 in the upward direction. With the lever 32 in the neutral position, the upper end of the push rod 126 engages the lower face of the arm 124 and the lower end of the push rod 126 engages the lower face of the switch plunger 134. Thus, when the control lever 32 is pivoted rearwardly the push rod 126 is depressed against the resistance of bias spring 138 and the lower end of the push rod moves away from the switch plunger 134 allowing the switch contacts 128 to close under the influence of the spring 132. When the control lever is pivoted forwardly from its neutral position the arm 124 moves away from the push rod 126 and the push rod retains its position which holds the switch plunger 134 depressed and the switch contacts 128 in the open position. In summary, with the lift control lever 32 in its neutral position, the lift control valve 104 is in its neutral position and the contacts of switch 112 are open. When the control lever 32 is pivoted in the lift direction (rearwardly) the lift control valve 104 is in the lift mode and the contacts of switch 112 are closed. When the control lever is pivoted in the lower direction (forwardly) the lift control valve 104 is in its lower mode and the contacts of switch 112 remain open. The speed control switch 112 is connected with a control circuit for the pump motor 62 which will be described subsequently.

The tilt control lever 34 is of the same construction as the lift control lever 32 as just described with reference to FIG. 5. The tilt control lever 34 controls the position of the tilt control valve 106 (see FIG. 3); however, there is no speed control switch associated with the tilt control lever 34. The valve 106 is preferably an open center spool valve and its connection in the hydraulic circuit 100 will be described subsequently. When the tilt control lever 34 is in its neutral position, the tilt control valve 106 is in its neutral position. When the control lever 34 is pivoted in the tilt-forward direction (forwardly) the tilt control valve 106 is in its tilt-forward mode. When the control lever 34 is pivoted in the tilt-backward direction (rearwardly), tilt control valve 106 is in its tilt-backwrd mode. The connection of the tilt control valve 106 in the hydraulic circuit 100 will be described subsequently.

The auxiliary control lever 36 is shown in FIG. 6, 6a and 6b. This control lever is adapted to actuate the auxiliary control valve 108 which is preferably a spool valve of the open center type. The control lever also controls the actuation of an intermediate speed control switch 144 which is of the same construction as switch 112 described above. (Corresponding parts of switches 112 and 144 have the same reference characters except that a prime symbol is added to the reference characters of switch 144.) The auxiliary control lever 36 is mounted on shaft 116 and is secured thereto for rotation of the shaft when the lever is rotated forwardly or rearwardly from its neutral position. The control lever 36 is provided with a slot 146 which receives a pin 148 extending through the operating stem 152 of the auxiliary control valve 108. Accordingly, when the control lever 36 is pivoted forwardly from its neutral position, the control valve 108 is operated in its forward mode and when the hand lever is rotated rearwardly, the valve 108 is operated in its rearward mode. The control lever 36 is adapted to operate the intermediate speed control switch 144 so that the switch is open with the lever in the neutral position and is closed when the lever is moved either forwardly or rearwardly from the neutral position. For this purpose, push rod 168 is reciprocally mounted in the housing 136 and is biased upwardly against the arm 166 by the bias spring 172. An intermediate lever 154 is mounted on the shaft 116 and is fixed thereto by a pin 156 for rotation with the shaft and with the control lever 36. A switch operating lever 158 is pivotally mounted on the intermediate lever 154 by a pivot pin 162 so that the switch operating lever 158 is free to rotate relative to the control lever 36 about the pivot pin 162, clearance from the shaft 116 being provided by a slot 164 in the lever 158. An arm 166 of the lever 158 is adapted to engage the push rod 168 and thrust the push rod downwardly when the switch actuating lever 158 is rotated in a clockwise direction. A shoulder 172 on the lever 158 overhangs an abutment 174 which is fixed relative to the housing 136. When the control lever 36 is pivoted rearwardly (FIG. 6, phantom lines) the shaft 116 rotates therewith and the intermediate lever 154 which is connected therewith by the pin 156 is caused to rotate in a clockwise direction. Thus, the pivot pin 162 carries the left end of lever 158 upwardly causing it to pivot about shaft 116. This rotates the arm 166 downwardly against the push rod 168 which allows the spring 132' to actuate the switch contacts 128' to the closed position. When the hand lever 36 is pivoted forwardly (phantom lines, FIG. 6a) the intermediate lever 154 pivots therewith and, through the pin 162, carries the left end of lever 158 downwardly so that the shoulder 172 engages the abutment 174. This causes the abutment 174 to serve as a fulcrum for the lever 158 and the downward thrust of the pivot pin 162 thereon causes the right hand end of the lever 158, i.e. the arm 166, to rotate downwardly. The downward motion of the arm 166 depresses the push rod 168 and the switch 144 is closed.

The connection of the intermediate speed control switch 144 in the motor control circuit will be described subsequently. Similarly, the auxiliary control valve 108 and its connection in the hydraulic circuit 100 will be described subsequently.

Pump Speed Control

According to this invention, the hydraulic pump 60, which is a positive displacement pump, is operated at different speeds according to the flow demand which varies with the operating mode of the hydraulic system. When a light load on the hydraulic system is selected, a low motor speed is adequate. For example, in a typical lift truck hydraulic system the power steering circuit requires a maximum of about five gallons per minute; with a positive displacement pump which is sized to deliver 20 gallons per minute at full speed of 1800 RPM, a pump speed of 800 RPM would be adequate for power steering. Similarly, for other operating modes, such as tilt of the upright, a low pump speed is adequate. For a heavy load on the hydraulic system, such as that imposed by operation in the lift mode either alone or with simultaneous operation in the steering or tilt mode, operation of the pump will be required at its maximum rated speed, such as 1800 RPM. For operation of the hydraulic system with an intermediate load, such as that imposed by operation in an auxiliary mode, for example a load handling clamp, intermediate flow is required and would be obtained at an intermediate speed, such as 1200 RPM. Accordingly, the operating speed range of the pump motor is determined by the selection of the operating mode of the hydraulic system. In the illustrative embodiment, the pump motor is operated in a low speed range when the hydraulic system is operated in the power steering or tilt mode or a combination thereof. It is operated an intermediate speed range for operation in an auxiliary mode or the combination thereof with the tilt and steer modes. The pump is operated in a high speed range for the lift mode and the combination thereof with any of the other modes. A motor speed control circuit will be described with reference to FIGS. 7 through 11.

Figure 7:
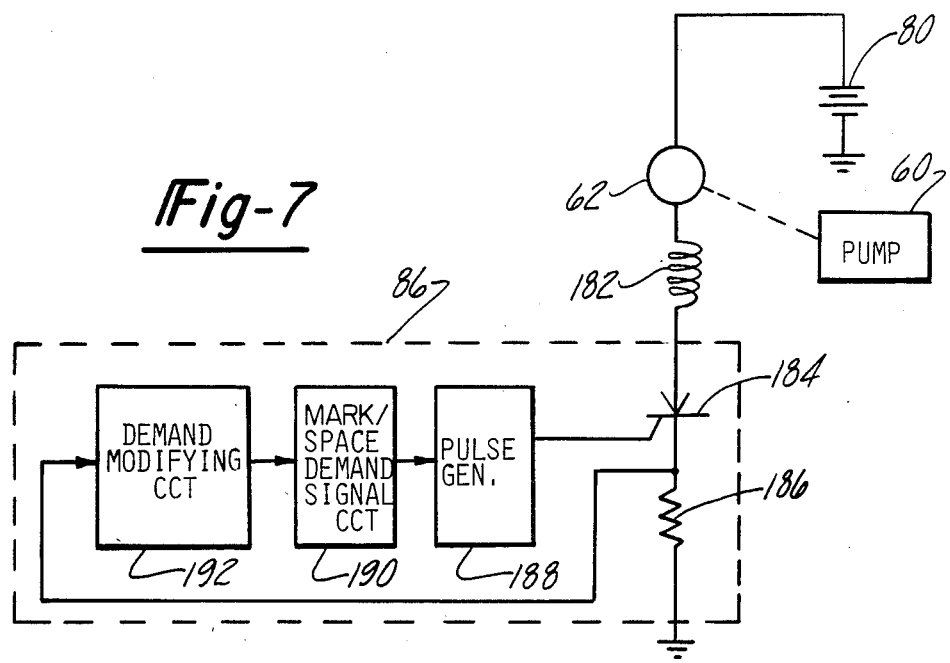
FIG. 7 shows the voltage control circuit for the drive motor of the pump.

As shown in FIG. 7, pump 60 is driven by a series DC motor 62 having a series field winding 182. The motor is energized from the battery 80 through a voltage control circuit 86. The voltage control circuit is adapted to regulate the motor speed within low, intermediate and high speed ranges according to the operating mode of the hydraulic circuit. For this purpose, the voltage control circuit 86 is a thyristor-type pulsing circuit having presettable means for determining the mark/space ratio for the different speed ranges and being provided with a feedback means for changing the mark/space ratio as a function of motor current. Such a motor control circuit is disclosed in Morton et al U.S. Pat. No. 4,119,898 granted Oct. 10, 1978.

The voltage control circuit 86 comprises a silicon control rectifier (SCR) 184 connected in series with the motor 62. A current sensing resistor 186 is connected in series with the SCR and develops a feedback voltage corresponding to the value of motor current. A pulse generator 188 supplies a pulse train to the gate of the SCR 184 which controls the effective motor supply voltage in accordance with the mark/space ratio of the pulse train. A mark/space demand signal circuit 190 produces a demand signal which is applied to the pulse generator 188 and determines the mark/space ratio of the pulse train. The value of the demand signal produced by the demand signal circuit 190 is modified by the demand modifying circuit 192 in accordance with the value of the feedback voltage supplied from the sensing resistor 186. In operation of the voltage control circuit 86, the demand modifying circuit 192 produces an output signal which increases in magnitude as a direct function of the feedback voltage from the resistor 186, and hence as a direct function of motor current. The mark/space demand signal circuit 190 produces a demand signal which increases from a minimum value when the motor current is zero to a maximum value when the motor current reaches a predetermined value $I_0$. This causes the pulse generator 188 to produce a pulse train having a mark/space ratio which increases from a predetermined minimum value to a maximum value in correspondence with the demand signal.

Figure 8:
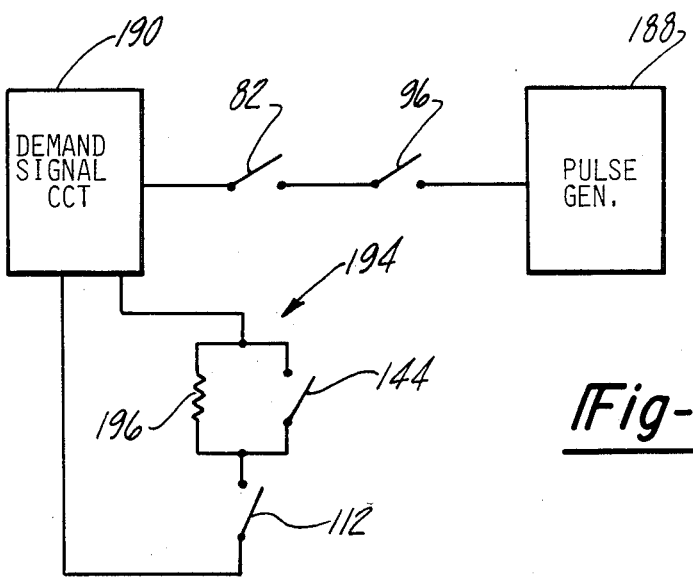
FIG. 8 shows certain details of the circuit of FIG. 7.

FIG. 8 shows certain details of the demand signal circuit 190 and its interconnection with the pulse generator 188. The output of the demand signal circuit 190 is connected with the input of the pulse generator 188 through a series connection of the key switch 82 and the pump switch 96, which were described with reference to FIG. 4. Accordingly, unless both the key switch and the pump switch are closed there is no demand signal input to the pulse generator 188 and the SCR is turned off and the motor 62 cannot be energized. The demand signal circuit 190 is provided with a speed range selection circuit 194 which comprises an external resistance switching loop for the demand signal circuit. The loop includes a resistor 196 which is connected in parallel with the speed control switch 144 and in series with the speed control switch 112. The speed control switch 112 is operated by the lift control lever 32, as described with reference to FIG. 5, and the speed control switch 144 is operated by the auxiliary control lever 36 as described with reference to FIG. 6. When both switches 144 and 112 are open, i.e. with both control levers in the neutral position, the resistor 196 is switched out of the circuit and the demand signal circuit 190 produces a demand signal corresponding to the low speed range. When the switch 112 is closed by actuation of the auxiliary control lever, the demand signal circuit 190 produces a demand signal corresponding to the intermediate speed range. When the switch 144 is closed by actuation of the lift control lever, the demand signal circuit 190 produces a demand signal corresponding to the high speed range. In this latter condition, the full battery voltage is applied to the pump motor.

Figure 9:
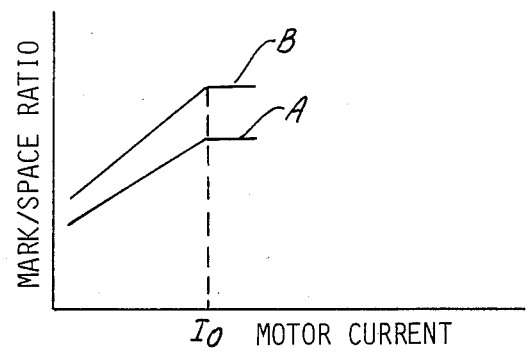
FIGS. 9, 10 and 11 are graphical representations of operational characteristics of the drive motor.
Figure 10:
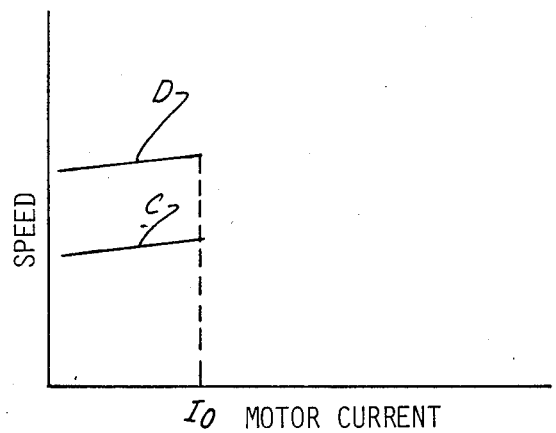
Figure 11:
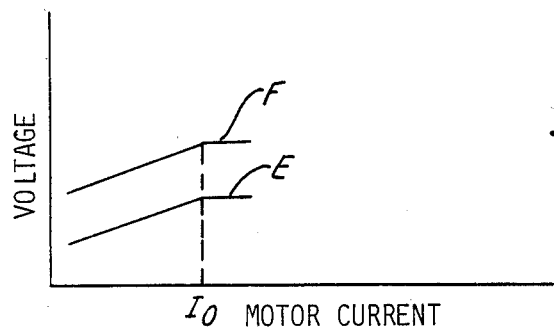

The operation of the pump motor is depicted by graphical representation in FIGS. 9, 10 and 11. In FIG. 9, curve A shows the mark/space ratio as a function of motor current for the low speed range of operation. Note that the mark/space ratio varies directly with motor current from zero current up to a predetermined current of $I_0$ at which point it reaches a maximum value which remains constant for higher values of motor current. Similarly, curve B represents the mark/space ratio as a function of motor current for the intermediate speed range. It is similar to curve A with higher values of mark/space ratio. In FIG. 10, curve C represents motor speed as a function of motor current for the low speed range of operation and similarly curve D is the speed curve for the intermediate speed range. FIG. 11 shows the motor voltage as a function of motor current; curve E represents the low speed range and the curve F represents the intermediate speed range of operation. When the motor is operated in either speed range, the feedback in the voltage control circuit 86 tends to maintain the motor speed substantially constant even though the load on the motor changes. This results because a change in load is reflected by the motor current and, as shown in FIG. 9, the mark/space ratio changes as a direct function of motor current. Increased load produces a higher mark/space ratio and hence a higher voltage is applied to the motor. As shown in FIG. 10, the motor speed remains almost constant when an increase in motor current is accompanied by a certain increase in motor voltage. Thus, when the speed selector circuit 194 is set for either the low speed range or the intermediate range, the selected speed is maintained within a given range of speed values by the voltage control circuit 86 even though the load on the motor is changed. Accordingly, for either speed range, the pump 60 produces a flow which is maintained within a given range of flow values regardless of changes of load on the motor by reason of the different operating conditions of the hydraulic circuit 100, as will be described below.

The Hydraulic System

General

Figure 12:
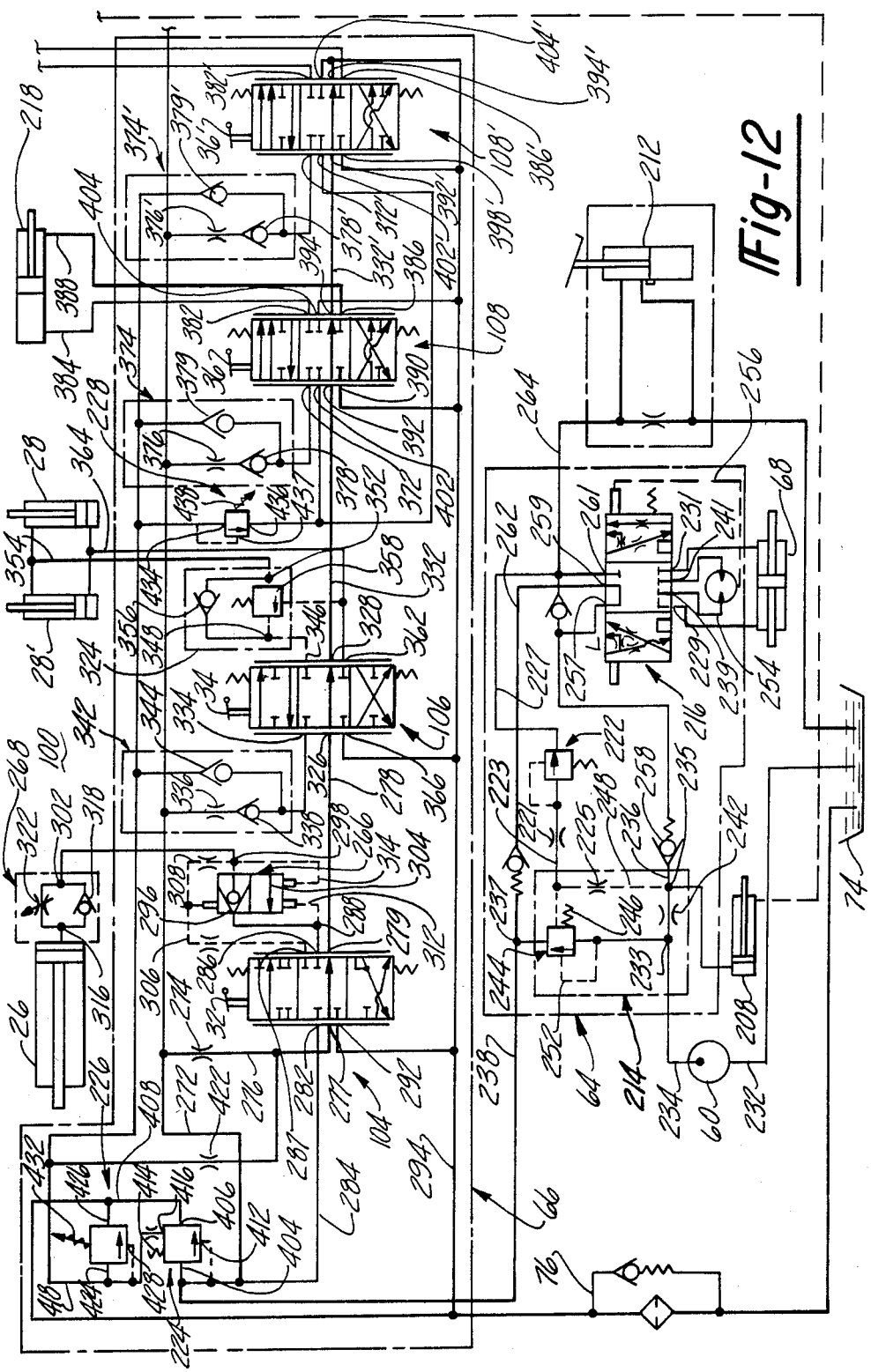
FIG. 12 is a schematic diagram of the hydraulic system.

A schematic diagram of the hydraulic system 100 is shown in FIG. 12. In general, the system comprises the positive displacement pump 60, the steering unit 64, and the main valve 66. The system also includes the hydraulic reservoir or tank 74 and a return line filter unit 76. Additionally, the hydraulic system is connected with the parking brake cylinder 208 and the service brake master cylinder 212.

The hydraulic system 100 is arranged so that the power steering circuit has priority over all other hydraulic functions in the vehicle. For this purpose, a priority demand valve 214 is provided; for design purposes, it is located in the steering unit 64. The steering unit 64 also includes the steering valve 216 which controls energization of the steering cylinder 68. The main valve 66, for design purposes, includes the lift control valve 104 which controls the lift cylinder 26 and the tilt control valve 106 which controls the tilt cylinders 28 and 28'. The main valve 66 also includes the auxiliary control valve 108 which controls the auxiliary cylinder 218. It also includes an auxiliary control valve 108' which controls an auxiliary cylinder, not shown. For the purpose of determining flow priority, the priority demand valve 214 is located upstream of the steering control valve 216 and the main valve 66. A pressure relief valve 222 is coupled between the priority demand valve 214 and the steering control valve 216. A two-stage pressure relief valve, also known as a hydrostat, is located, for design purposes, in the main valve 66. The two-stage pressure relief valve includes a secondary or main relief valve 224 which is controlled by a primary or pilot relief valve 226 and by a primary or pilot relief valve 228. A more detailed description of the hydraulic system will be given below.

As shown in FIG. 12, the pump 60 has its inlet connected through a conduit or line 232 to the tank 74. The outlet of the pump 60 is connected through a line 234 to the inlet port 233 of the priority demand valve 214. The priority demand valve 214 has a primary outlet port 235 connected with a line 236 and a secondary outlet port 237 connected with a line 238. The priority demand valve comprises a flow restrictor or orifice 242 connected between the inlet port 233 and the primary outlet port 235 and it includes a relief valve 244 connected between the inlet port and the secondary outlet port 237. The relief valve 244 is biased closed by the bias spring 246 and by fluid pressure communicated through a pilot line 248; the valve is urged toward the open position by the pressure communicated through a pilot line 252. The priority demand valve 214 is adapted to give priority to the flow requirements of the power steering system through the primary outlet port 235 to line 236; if the input flow to the priority demand valve through line 234 is greater than that to be allocated to the power steering system, the excess flow is diverted through the relief valve 244 to the secondary outlet port 237 and through line 238 for use by other hydraulic functions. For this purpose, the parameters of the orifice 242 and the relief valve 244 are correlated so that the full-rated flow for power steering through the orifice 242 produces a sufficient pressure drop thereacross to open the relief valve 244. Accordingly, the flow through the primary outlet port 235 into line 236 will never exceed the full-rated flow of the power steering system and if the inlet flow from the pump exceeds that value, the excess flows through the relief valve 244 to the secondary outlet and the line 238. For example, in the illustrative embodiment being described, the power steering circuit may be rated for a maximum of five gallons per minute and a maximum of 1000 PSI. It will be appreciated that the actual flow and pressure will be determined by the actuation of the steering control valve and the load imposed by the steering system. The flow produced to the inlet port 233 of the priority demand valve 214 through the line 234 depends, of course, upon the speed of the pump 60. As will be described further below, in the example of this illustrative embodiment, operation in a low speed range of about 800 RPM is used for the power steering and tilt functions. This provides about five gallons per minute and the pressure may vary over a range up to 1000 PSI, depending upon load. Operation in an intermediate speed range of about 1200 RPM is used for the auxiliary devices such as a load handling clamp; the flow requirement may be about nine gallons per minute and the pressure may range up to 2000 PSI. In operation of the pump at high speed which may be about 1800 RPM for the lift function, the flow may be about 20 gallons per minute with pressures ranging up to 3000 PSI.

Power Steering Circuit

The power steering circuit comprises the steering control valve 216, the steering cylinder 68 and it also includes a follow-up motor 254. The steering control valve 216 is a metering valve having an open center spool adapted for bi-directional actuation from a neutral position. The valve is adapted to control the energization of the steering cylinder 68 which is a double acting cylinder for actuating the dirigible vehicle wheels. The follow-up motor 254 has its rotor connected through a mechanical follow-up linkage 256 with the valve 216 to null the valve when the dirigible wheels reach the commanded position. The primary outlet port 235 of the priority demand valve 214 is connected through the line 236 and a check valve 258 to the pressure inlet port 257 of the steering control valve 216. A primary return line 262 is connected with a return port 259 on the control valve 216. A secondary return line 264 is connected with a return port 261 on the control valve 216. The relief valve 222 is provided to prevent excessive pressure in the steering system. For this purpose, it has its inlet port connected through a flow restrictor 221 and a line 223 to the downstream side of a flow restrictor 225 in the pilot line 248. The outlet port of the relief valve 222 is connected through a line 227 to the secondary return line 264. Thus if the pressure at the outlet port 235 of the priority demand valve 214 becomes excessive, the pressure relief valve 222 opens and dumps fluid to the return line 264. The steering control valve 216 has primary outlet ports 229 and 231 connected with opposite ends of the steering cylinder 68 and follow-up outlet ports 239 and 241 connected with opposite ports of the follow-up motor 254.

Lift-Lower Circuit

The lift-lower circuit includes a lift control valve 104 which is a metering valve having an open center spool which is bi-directionally positioned by the lift control lever 32. The lift control valve 104 communicates with the single-ended lift cylinder 26 through a lift-lower control valve 266 and a lowering flow control valve 268. The secondary outlet port 237 of the priority demand valve 214 is connected through line 238 to a line 272 and thence through a flow restrictor 274 and line 276 to the open center inlet port 277 of the valve 104. The open center outlet port 279 of the valve 104 is connected through a line 278 to the tilt control valve 106. The priority demand valve 64 also has its secondary outlet port 237 connected with the control inlet port 282 of the lift control valve 104 through the line 238 and a line 284. The control outlet port 286 of the lift control valve 104 is connected with the port 288 of the lift-lower valve 266. The lift control valve 104 has a return line port 292 connected to a return line 294 which, in turn, is connected through the return line filter unit 76 to the tank 74.

The lift-lower valve 266 comprises a ball-check 296 which is connected between the port 288 and a port 298 for operation in the load lifting mode. The port 298 is connected with the port 302 of the flow control valve 268. The lift-lower valve 266 is provided with a flow-through connector 304 which is connected between the ports 288 and 298 for operation in the load lowering mode. For the purpose of shifting the connector 304 when operating in the lowering mode, the valve is provided with pilot lines 306, 308, 312 and 314.

The lowering flow control valve 268 has a port 302 connected with the port 298 of the lift-lower valve 266. It also has a port 316 connected with the lift-lower single-ended cylinder 26. A check valve 318 and a variable orifice, constant flow valve 322 are connected in parallel between the ports 302 and 316.

Operation of the lift-lower circuit will be described in greater detail subsequently.

Tilt Circuit

The tilt control valve 106 is a metering valve of the type having an open center spool which is bi-directionally movable by the tilt control lever 34. The valve 106 communicates with the single-ended tilt cylinders 28 and 28′ through a counterbalance valve 324. The tilt control valve 106 has an open center inlet port 326 connected through the line 278 with the open center outlet port 279 of the lift control valve 104. Control valve 106 also has an open center outlet port 328 which is connected through a line 332 to the auxiliary control valve 108. The tilt control valve 106 has a control inlet port 334 connected with the secondary outlet port 237 of the priority demand valve 214; this connection extends through the line 238 and 272 and a flow restrictor 336 and a check valve 338 in a flow control valve 342. The flow control valve 342 also includes a pressure sensor in the form of a ball-check 344 this ball check 344 is used to transmit pressure from the inlet port of the control valve 106 to the pressure sensing line 418. This ball check 344 is effective to transmit fluid pressure by reason of very small leakage inherent in the check valve; however, the leakage is so small that there is an insignificant amount of flow. The tilt control valve 106 has a control outlet port 346 which is connected to a port 348 of the counterbalance valve 324. Another port 352 on the counterbalance valve is connected through a line 354 to the tilt cylinders 28 and 28′ at the rod-end thereof. The counterbalance valve 324 includes a check valve 356 and a relief valve 358 connected in parallel between the ports 348 and 352 thereof. The tilt control valve 106 also includes a return inlet port 362 which is connected through a line 364 with the tilt cylinders 28 and 28′ at the piston ends thereof. A return outlet port 366 is connected to the return line 294. Operation of the tilt circuit will be described in greater detail subsequently.

Auxiliary Circuit

The auxiliary control valve 108 is a metering valve having an open center spool which is bi-directionally movable by the auxiliary control lever 36. The auxiliary control valve 108 is adapted to control the energization of the double-acting auxiliary cylinder 218. The control valve 108 has a control inlet port 372 which is connected with the secondary outlet port 237 of the priority demand valve 214 through a flow control valve 374. This connection extends through line 238 to line 272, and thence to flow control valve 374 which includes a flow restrictor 376 and check valve 378 connected in series. The flow control valve also includes a pressure sensor in the form of a check valve 379. This check valve 379 is used to transmit pressure from the inlet port of the control valve 108 to the pressure sensing line 418. The check valve is effective to transmit fluid pressure by reason of very small leakage inherent in the valve; however, the leakage is so small that there is an insignificant amount of flow. The auxiliary control valve 108 has a control port 382 which is connected through a line 384 to one end of the cylinder 218. The auxiliary control valve 108 includes a control port 386 which is connected through a line 388 with the other end of the cylinder 218. The auxiliary control valve 108 has an open center inlet port 392 which is connected with the open center outlet port 328 of the tilt control valve 106 through the line 332. The valve 108 has an open center outlet port 394 which is connected with the auxiliary control valve 108' through a line 332'. The valve 108 has a return outlet port 398 which is connected with the return line 294. The valve also has a flow return inlet port 402 connected with the outlet port of the pilot relief valve 228. A return outlet port 404 is connected with the return line 294.

Operation of the auxiliary circuit will be described in greater detail subsequently.

The auxiliary control valve 108' is identical to control valve 108 just described and it is connected in the hydraulic system in exactly the same manner to control an auxiliary double-acting cylinder (not shown). Accordingly, the description of auxiliary control valve 108 is applicable to control valve 108' and the description will not be repeated.

Two-Stage Relief Valve

With further reference to FIG. 12, the two-stage relief valve will now be described. As previously alluded to, this two-stage valve comprises a main relief valve 224, a pilot relief valve 226 and a pilot relief valve 228. This two-stage valve is adapted to relieve the pressure at the outlet port 237 of the priority demand valve 214 when it exceeds a predetermined operating value for different operating conditions. In particular, when operating in the lift mode, i.e. with the lift control valve 104 open, which calls for high speed pump operation, the pressure is to be limited, for example, to 3000 PSI. When operating in the auxiliary mode, i.e. with the auxiliary control valve 108 open with the pump operating at intermediate speed, the pressure is to be limited, for example, to 2000 PSI. The main relief valve 224 has an inlet port 404 connected with the outlet port 237 of the priority demand valve 214. The outlet port 406 of the valve 224 is connected through a line 408 to the return line 294. The relief valve 224 includes a pilot port 412 on one side and a bias spring 414 and a bias port 416 on the other side. The bias port 416 is connected through a pressure sensing line 418, a flow restrictor 422 and the flow restrictor 274 to the pressure supply line 272. The pilot relief valve 226 has an inlet port 424 connected with the pressure sensing line 418 and has an outlet port 426 connected to the return line 408. The pilot port 428 is connected on one side and an adjustable bias spring 432 is connected on the other side. The bias spring is adjusted, for example, to cause the valve to crack open at 3000 PSI. The pilot valve 228 has an inlet port 434 connected with the pressure sensing line 418 and an outlet port 436 connected with the return inlet port 402 of the auxiliary control valve 108. The return outlet port 404 of this control valve is connected to the return line 294. The pilot relief valve 228 has a pilot port 437 on one side and an adjustable bias spring 438 on the other side. The bias spring 438 is adjusted, for example, for a pressure of 2000 PSI.

Operation

The operation of the illustrative embodiment of the invention will be described with reference primarily to FIGS. 4, 7, 8 and 12 through 16. It is noted that FIGS. 13, 14, 15 and 16 are basically the same schematic diagram as FIG. 12 described above; however, each of FIGS. 13 through 16 has heavy lines superimposed thereon to depict the fluid flow paths for different operating conditions. A heavy solid line represents a hydraulic line under pump pressure, and a heavy dashed line represents a hydraulic line with return flow to the tank, as indicated in the legend of each figure.

Idle Mode

Referring first to FIG. 12, the hydraulic system will be described in the standby or idle condition with the pump running at low speed without a load on the system. The pump motor 62 is started when the key switch 82 is closed and the driver's seat is occupied with the drive selector lever in forward, neutral or reverse so that the pump switch 96 is also closed. In this condition, pump motor 62 is energized by the voltage control circuit 86 for operation at a low speed, about 800 RPM. The pump 60 delivers a flow ranging up to about five gallons per minute to the inlet port 233 of the priority demand valve 214. This value of flow does not cause sufficient pressure drop across the flow restrictor to open the valve 244. Accordingly, the entire flow from the pump is delivered through the outlet port 235 of the priority demand valve inlet port 257 of the steering control valve 216. With no steering effort applied to the steering wheel, the control valve is in a neutral position and the fluid flows through the open center of the valve to the outlet port 259 thence through the supply lines 262 and 238 to the main valve 66. In the main valve, the flow passes through lines 272 and 276 and through the open center ports of lift control valve 104, tilt control valve 106, and auxiliary control valves 108 and 108' to the return line 294 and back through the filter unit 76 to the tank 74. Also, the pump supplies fluid under pressure from the supply line 234 to the parking brake cylinder 208 to release the parking brake of the lift truck in readiness for vehicle movement. In this idle mode of operation, the lift truck is in condition for operation in the steering mode or any of the other operating modes, as will be described subsequently.

Steering Mode

Figure 13:
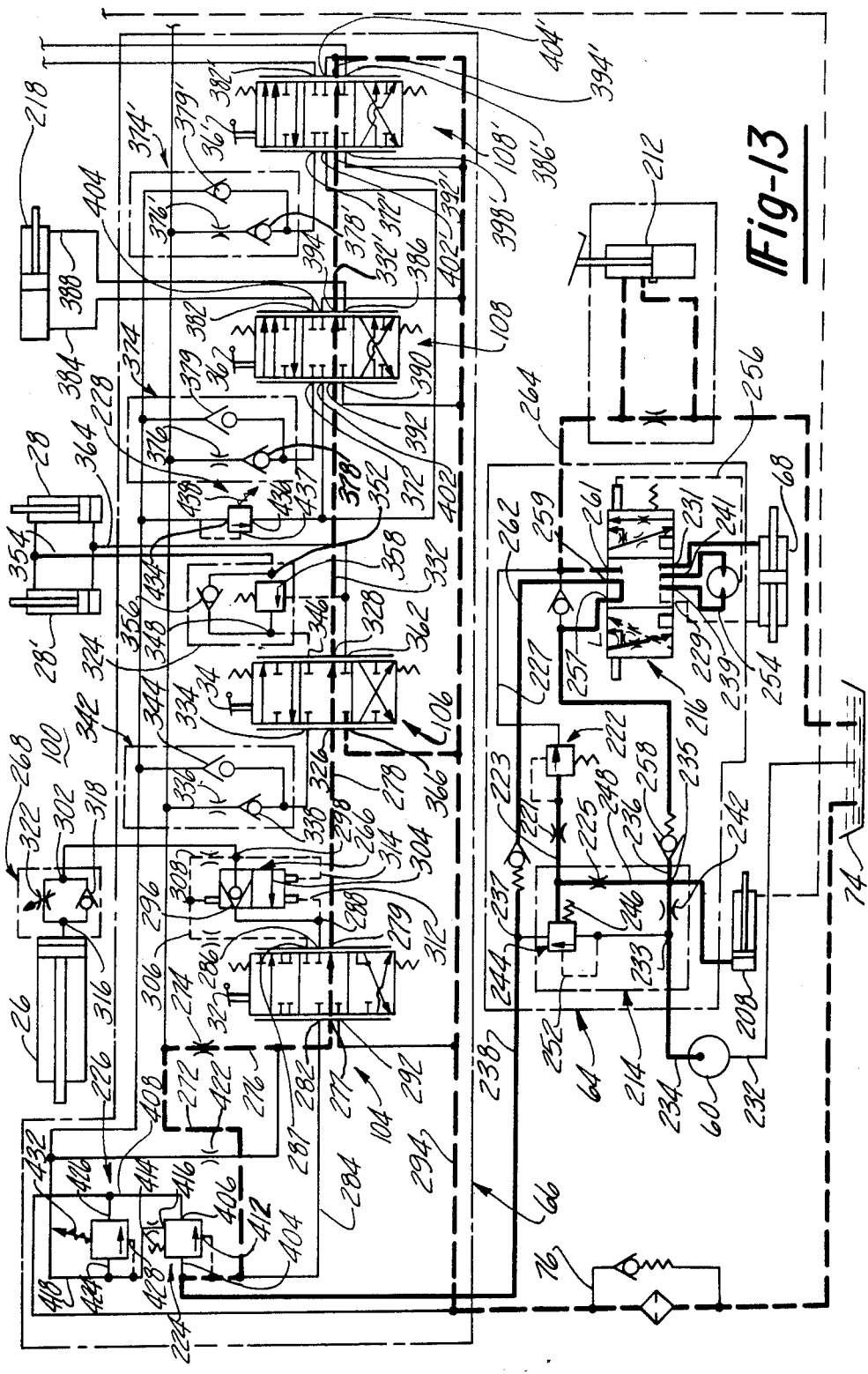
FIG. 13 shows a schematic diagram of the hydraulic system energized in the steering mode.

When the lift truck is operated in the steering mode, the hydraulic system is energized in the manner depicted in FIG. 13. In this operating condition, the pump 60 is operated at low speed and pump pressure is supplied to the steering control valve 216 as described above with reference to FIG. 12 for the idle mode. Also, pressure is supplied from the pump to the parking brake 208 as previously described. When the steering wheel 18 is turned either left or right, the steering control valve 216 is displaced in a corresponding direction for energization of the steering cylinder 68. For example, for a left turn, the spool of the steering control valve 216 is displaced so that the inlet port 257 is connected with the follow-up port 239 and thence through the follow-up motor 254 to the follow-up port 241 and thence through the outlet port 231 to the right hand side of the steering cylinder 68. At the same time the left hand side of the cylinder 68 is connected through the port 229 to the return port 261 and thence to the return line 264. To carry overflow from the steering control valve 216, the inlet port 257 is connected through a flow restrictor to the outlet port 259 and thence through line 262 to the main valve 66. The return line 264 extends to the tank 74 by way of a connection with the master cylinder 212 of the vehicle service brake to maintain the master cylinder supplied with fluid. Thus, the steering cylinder 68 is energized to turn the dirigible wheels of the lift truck and the follow-up motor 254 is energized to null the position of the steering control valve when the dirigible wheels reach the position commanded by the steering wheel. It will be appreciated that operation of the steering wheel for a right hand turn results in the opposite displacement of the steering control valve 216 with consequent opposite energization of the steering cylinder 68. The steering control valve 216 is a metering valve and hence a higher rate of turning of the steering wheel results in a greater flow to the cylinder 68 and faster displacement of the dirigible wheels. The priority demand valve 214 is operative to supply the required flow to the steering system, as a matter of priority over the other hydraulic functions, up to the full-rated flow of the steering system, such as five gallons per minute.

In the event that the driver makes an extremely sharp turn in either direction, the piston in the steering cylinder 68 may bottom out, i.e. reach its limiting position, so that the cylinder cannot accept additional fluid. This results in operation of the relief valve 222. When the piston of the steering cylinder 68 bottoms out, the fluid pressure in the line 257 will increase abruptly. This increased pressure will appear at the primary outlet port 235 of the priority demand valve 214 and will be communicated through the flow restrictor 225 and the line 223 to the inlet port of the pressure relief valve 222. When the pressure exceeds a preset value, for example, 1000 PSI, the relief valve 222 will crack open and will relieve the pressure through line 227 to the return line 264. The flow through the relief valve 222 is restricted by reason of the flow restrictor 225 and the flow restrictor 221 to a value of 0.2 to 0.3 gallons per minute, which is sufficient to maintain the pressure below the preset value.

Lift Mode

Figure 14:
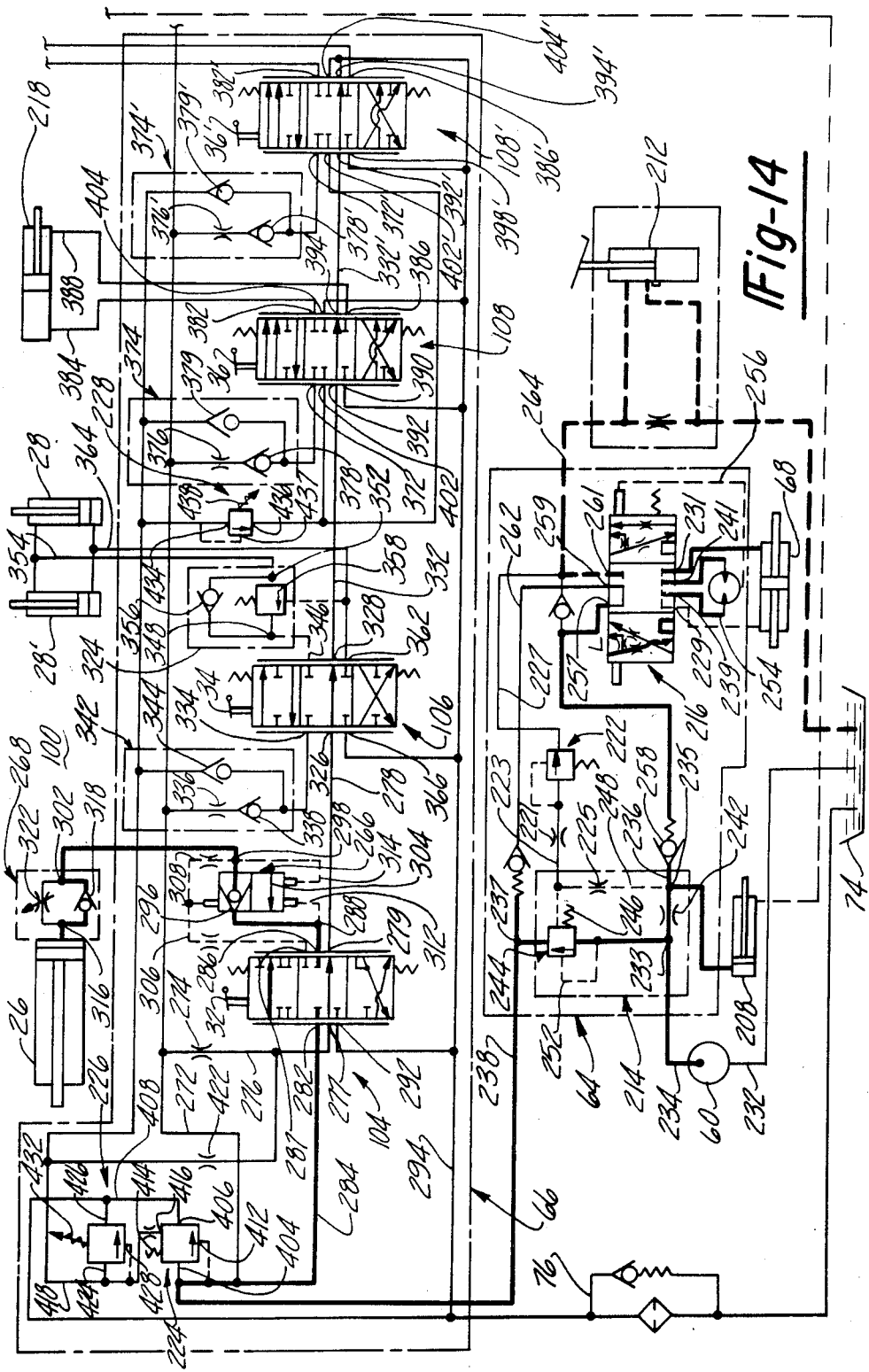
FIG. 14 shows a schematic diagram of the hydraulic system energized in the lift and steering mode combined.

When the lift truck is operated in the lift mode and the steering mode combined, the hydraulic system is energized as shown in FIG. 14. This operating condition is obtained by moving the lift control lever 32 in the rearward direction which, as described with reference to FIG. 5, displaces the lift control valve 104 in the lift direction and it also causes the speed control switch 112 (see FIGURE) to close. When the speed control switch 112 is closed, the voltage control circuit 86 causes the pump motor 62 to operate at full speed of about 1800 RPM. Accordingly, the pump 60 will deliver a flow ranging up to 20 gallons per minute to the inlet port 233 of the priority demand valve 214. A flow of about five gallons per minute through the flow restrictor 242 will cause a sufficient pressure drop thereacross so that the differential pressure between pilot lines 248 and 252, combined with the bias spring 246, will cause the valve 244 to open. Accordingly, the flow delivered from the pump to the inlet port 233 will be divided between the primary outlet port 236 and the secondary outlet port 237 of the priority demand valve. The steering system will be given priority with sufficient flow for operation thereof, up to five gallons per minute, so that the driver may operate the steering system at any time. When the steering wheel is operated for a left turn, for example, the steering system will be energized as previously described with reference to FIG. 13. Additionally, the flow delivered by the pump 60 in excess of that supplied to the steering system will be delivered to the main valve 66 through the secondary outlet port 237 of the priority demand valve 214. With the lift control valve 104 displaced in the lift direction, the fluid flows from the outlet port 237 through lines 238 and 284 to the inlet port 282 of lift control valve 104 and thence through the outlet port 286 to the port 288 of the lift-lower valve 266. From the port 288, the fluid flows through the ball-check 296 to the port 298 and thence through the ball-check valve 318 in the lowering flow control valve 268 to the lift cylinder 26.

In the event that the lift control valve 104 is actuated in the lift mode until the piston bottoms out in cylinder 26, the main valve 66 will operate in the relief mode. As discussed above, the two-stage relief valve, including the main relief valve 224 and the pilot relief valve 226, is adapted to relieve pressure in the lift control system when the pressure reaches a preset value, for example, 3000 PSI. For this purpose, the pilot relief valve 226 is adapted to crack open when the pressure on the pressure sensing line 418 reaches 3000 PSI. Note that the pressure sensing line 418 communicates through the flow restrictor 422 and through the lines 276 and 272 with the line 284 at the inlet port 282 of the lift control valve 104. When the pilot relief valve 226 opens, it reduces the pressure at the bias port 416 of the main relief valve 224. Accordingly, the main relief valve is opened and the two valves operate cyclically to maintain the supply pressure below the preset value of 3000 PSI.

Lowering Mode

Operation of the system in the lowering mode will be explained with reference to FIG. 12. In order to lower the load, the lift control lever 32 is moved forwardly. This displaces the lift control valve 104 to the lowering position; it also leaves the speed control switch 112 in the open position, the same as with the lift control lever in neutral. Thus, the pump motor 62 is operated in its low speed range of about 800 RPM and the pump 60 will deliver a flow ranging up to about five gallons per minute. In this operating mode, the lift control valve 104 is positioned so that the port 286 is connected with the return port 292 which, in turn is connected through the return line 294 to the tank 74. Additionally, the pilot port 287 is connected with the port 286 and hence the return line 294. Further, the open center inlet port 277 is connected with the open center outlet port 279 and thence through the open center ports of tilt control valve 106, auxiliary control valve 108 and auxiliary control valve 108' to the return line 294. In this condition, the fluid in the lift cylinder 26 is pressurized by the load on the carriage. Accordingly, the fluid in the cylinder 26 flows through the variable orifice, constant flow valve 322 and through the flow-through connector 304, which is shifted to the open position by the fluid pressures on pilot lines 306, 312, 314 and 308. By reason of the constant flow valve 322, the lowering flow control valve 318 is effective to cause lowering of the load at constant speed.

It will be understood that the priority demand valve 214 is operative in the lowering mode of operation to supply the required flow for operation of the power steering system.

Tilt Mode

Figure 15:
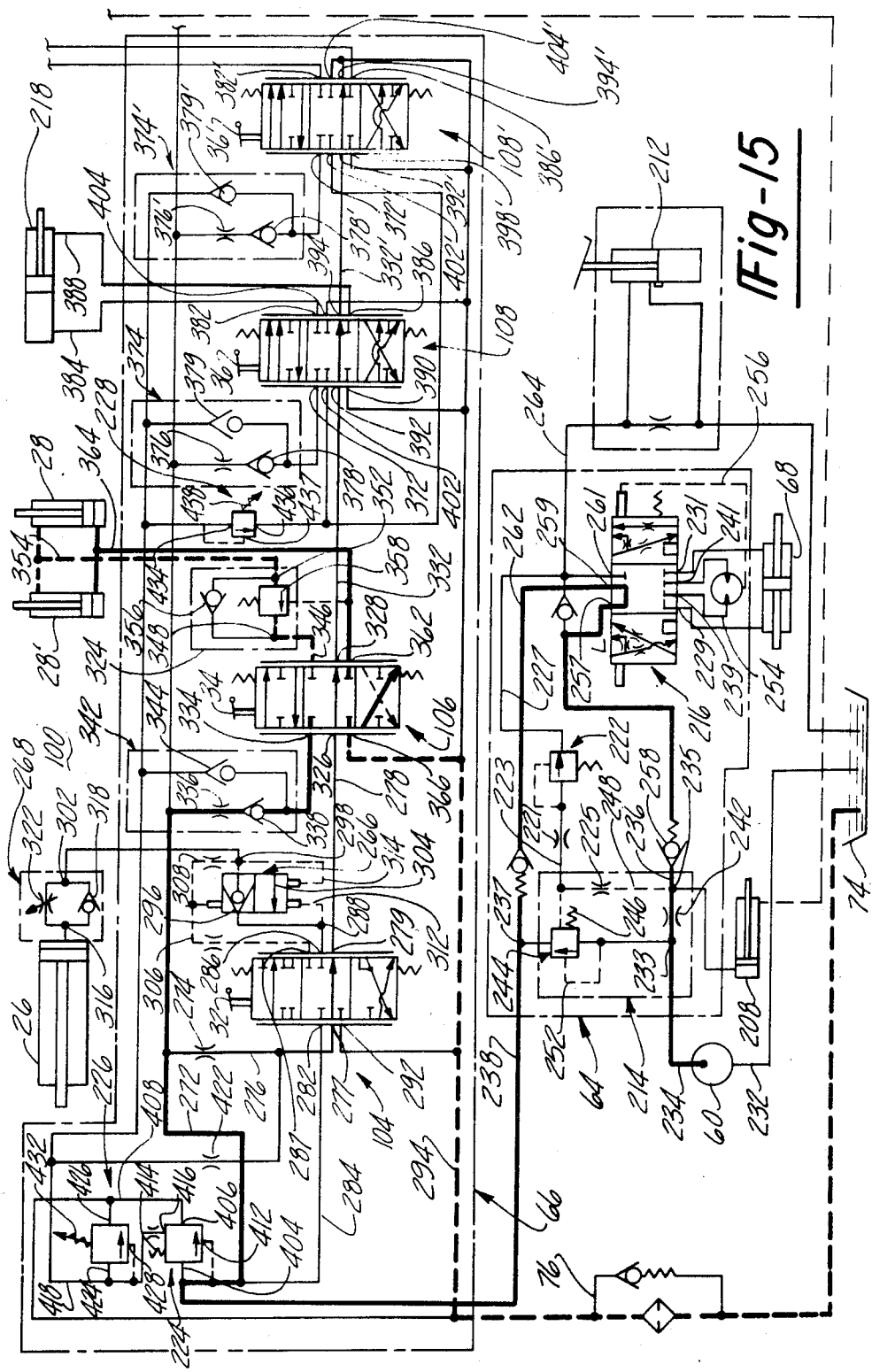
FIG. 15 shows a schematic of the hydraulic system energized in the tilt mode.

In operation of the system in the tilt-forward mode, the hydraulic system is energized as shown in FIG. 15. This operation is obtained by moving the tilt control lever 34 in the forward direction. This, as described with reference to FIG. 5, displaces the tilt control valve 106 to the tilt-forward position. There is no speed control switch associated with the tilt control lever 34 and consequently operation of the lever does not affect the motor speed control circuit 86. Hence, the pump motor is energized for operation in the low speed range at about 800 RPM and the pump delivers a flow, ranging up to about five gallons per minute, to the inlet port 233 of the priority demand valve 214. Assuming no steering, the flow from the primary outlet port 236 of the priority demand valve passes through the ports 257 and 259 of the steering control valve 216 and thence through lines 262, 238 and 272 to the flow control valve 342. At this valve, the fluid flows from the line 272 through the flow restrictor 336 and the check valve 338 to the inlet port 334 of the tilt control valve 106. With this valve in the tilt-forward position, the inlet port 334 is connected with the outlet port 362 which is connected through line 364 with the piston ends of the tilt cylinders 28 and 28'. The rod-ends of the cylinders 28 and 28' are connected through line 354 to the inlet port 352 of the counterbalance valve 324. The relief valve 358 remains closed until the supply pressure on line 364, as sensed by the pilot line to the valve 358 is sufficient to open the valve 358. When the valve 358 opens, fluid from the rod-ends of the tilt cylinders 28 and 28' is returned through the relief valve 358 through the ports 346 and 366 of the tilt control valve to the return line 294 and thence to tank 74. It is noted that the counterbalance valve 324 is operative to maintain a positive fluid pressure in the piston-ends of the tilt cylinders so as to counterbalance the tendency of the mast or upright to rotate forwardly under the influence of a load on the carriage.

In the tilt-forward mode of operation, it is possible to have an operating condition (not depicted in FIG. 15) in which a pump flow through lines 262 and 238 is greater than the flow through the counterbalance valve 324. In this, an increased pressure at the inlet port 334 on the tilt control valve 106 will be sensed through the ball-check 344 and applied to the bias port 416 of the main relief valve 224. This will cause the main relief valve 224 to open and the excess flow will be relieved through the valve and through line 408 to the tank 74.

The tilt-backward mode is not depicted in FIG. 15 but will be described with reference to FIG. 12. The tilt-backward operation is obtained by moving the tilt control lever 34 rearwardly; this displaces the tilt control valve 106 to the tilt-backward position. The voltage control circuit 86 for the motor 62 is unchanged by this movement of the tilt control lever and, if the other control levers are not actuated, the motor is operated in its low speed range, as described above with reference to the tilt-forward mode. With the tilt control valve in the tilt-backward position, the fluid from the pump 60 flows through the priority demand valve 214 and through the steering control valve 216 and thence through lines 262, 238 and 272 through the check valve 338 to the inlet port 334 of the tilt control valve 106. The flow proceeds through the outlet port 346 and the ball-check valve 356 and through the line 354 to the rod-ends of the tilt cylinders 28 and 28'. The piston ends of the cylinders are connected through line 364 to the port 362 of the tilt control valve and thence through the port 366 and the return line 294 to the tank 74.

Auxiliary Mode

Figure 16:
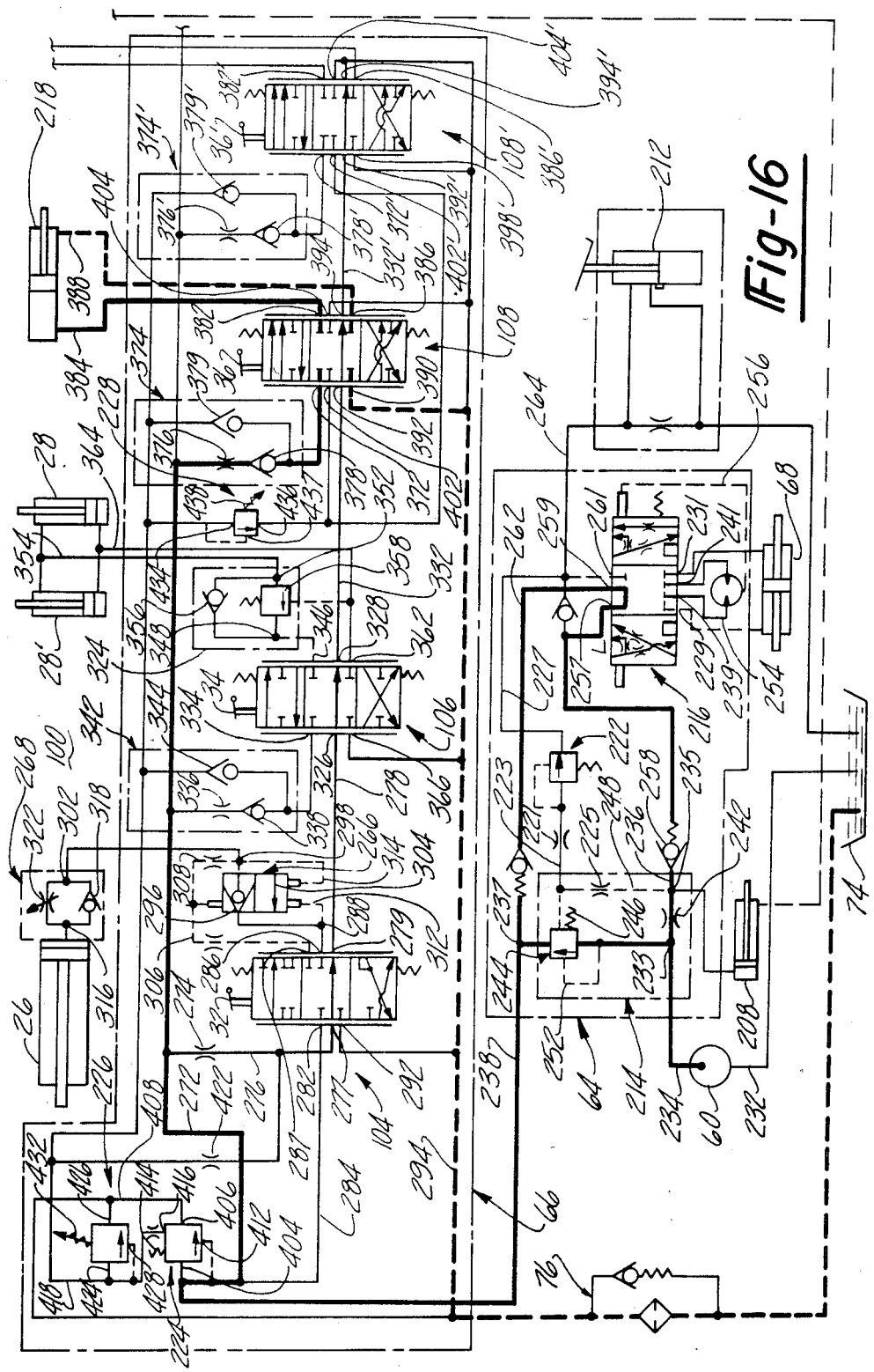
FIG. 16 shows a schematic diagram of the hydraulic system energized in the auxiliary mode.

When the lift truck is operated in the auxiliary mode, the hydraulic system is energized as shown in FIG. 16. This operating condition is obtained by moving the auxiliary control lever 36 in either the forward or rearward direction depending upon the desired direction of movement of the auxiliary load handling device which, for example, may be a load engaging clamp. As described with reference to FIG. 6, movement of the auxiliary control lever 36 in either the forward or rearward direction causes the speed control switch 144 to close. When the auxiliary control lever 36 is moved forward, the auxiliary control valve 108 is displaced to its forward position and when the lever is moved rearward the valve is displaced to its rearward position. When the speed control switch 144 closed, the voltage control circuit 86 causes the pump motor 62 to operate at its intermediate speed range of about 1200 RPM. Accordingly, the pump 60 will deliver a flow ranging up to 9 gallons per minute to the inlet port 233 of the priority demand valve 214. The pump flow will be divided between the primary outlet port 236 and the secondary outlet port 237 of the priority demand valve 214, as previously described. The flow from the secondary outlet port 237 will be delivered through lines 238 and 272 and through the flow restrictor 376 and the check valve 378 to the inlet port 372 of the auxiliary control valve 108. With the control valve 108 in its forward position, inlet port 372 is connected with the outlet port 382 which in turn is connected through line 384 to one end of the auxiliary cylinder 368. The other end of this cylinder is connected through line 388 and valve ports 386 and 398 and thence through the return line 294 to the tank 74. When the auxiliary control lever is moved in the rearward direction, the auxiliary control valve is moved to the rearward position and the auxiliary cylinder 368 is energized for movement in the opposite direction.

In the event that the auxiliary control valve 106 is actuated in the forward mode until the piston bottoms out in cylinder 368, the main valve 66 will operate in the relief mode (not depicted in FIG. 16). In this case, the two-stage relief valve, which includes the main relief valve 224 and the pilot relief valve 228, is adapted to relieve pressure in the auxiliary control system when the pressure reaches a preset value, for example, 2000 PSI. For this purpose, the pilot relief valve 228 is adapted to crack open when the pressure on the pressure sensing line 418 reaches 2000 PSI. Pressure sensing line 418 communicates through the ball-check 379 with the inlet port 372 of the auxiliary control valve 108. When the pilot relief valve 228 opens, it connects the pressure sensing line 418 through the valve ports 402 and 404 and thence through return line 294 to the tank 74. This reduces the pressure at the bias port 416 of the main relief valve 224. Accordingly, the main relief valve is opened and the two valves operate cyclically to maintain the supply pressure below the preset value of 2000 PSI.

Additional Embodiment of the Invention

The invention has been described above in an embodiment in a work vehicle, such as a lift truck, which uses an electric motor as the prime mover. The invention is also useful in a work vehicle having an internal combustion engine as the prime mover. This additional embodiment will be described with reference to FIG. 17.

Figure 17:
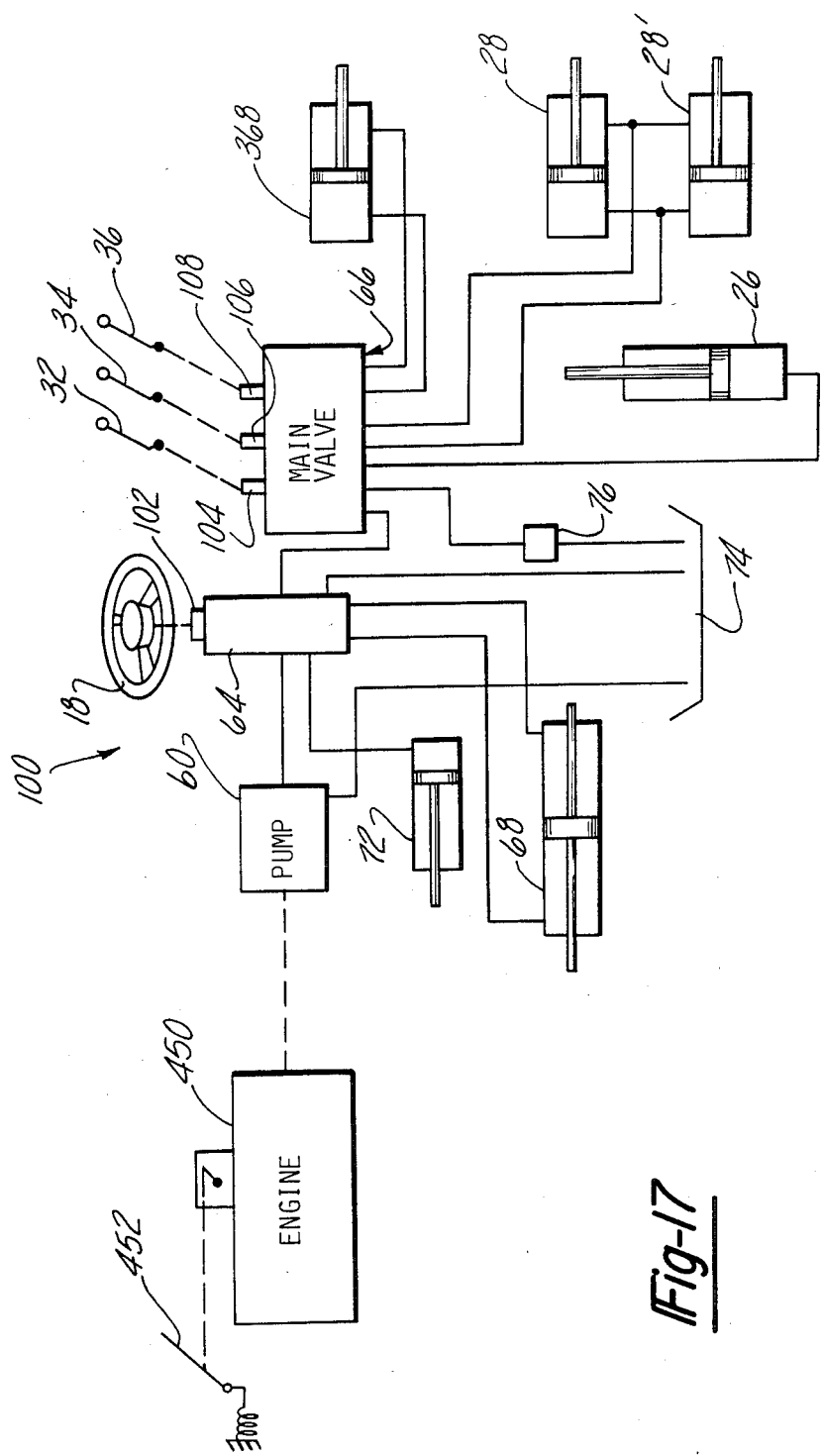
FIG. 17 shows an additional embodiment of the invention.

As shown in FIG. 17, the hydraulic system is the same as that described above with reference to FIGS. 3 and 12 through 16. The pump 60 of the hydraulic system, however, is driven by an internal combustion engine 450 (instead of the electric drive motor 62 of FIG. 3). The control levers 32, 34 and 36 are the same as described above with reference to FIGS. 5, 6, 6a and 6b; note however, that the speed control switches 112 and 144 are omitted.

The engine 450 is drivingly connected with the pump 60 and is operable to drive the pump over a wide speed range, for example, from 600 RPM to 2600 RPM. The speed control means for the engine is conventional and includes a throttle which is manually actuated by an accelerator pedal 452. Accordingly, the vehicle driver may selectively operate the engine in a low speed range, say 600 to 1000 RPM, or an intermediate speed range say 1000 to 1600 RPM, or a high speed range, say 1600 RPM to 2600 RPM. The engine 450 is used also for propelling the vehicle and is coupled with the traction wheels in a conventional manner. Alternatively, the engine 450 may not be used for traction purposes and a separate traction motor may be provided for the vehicle.

The hydraulic system is operated in the idle mode when the pump is driven in the low speed range without any load on the system. In this condition, the pump 60 will deliver a flow sufficient to supply the requirements of the power steering circuit, as described as above with reference to FIG. 13. To operate the lift truck in the lift mode and the steering mode combined, the driver actuates the lift control lever and also depresses the accelerator pedal 452 to increase the pump speed to the high speed range. This operating condition is the same as described above with reference to FIG. 14. Operation in the lowering mode is obtained by actuation of the lift control lever 32 with the accelerator pedal released so as to operate the pump in the low speed range. This operating condition is the same as described above with reference to FIG. 12.

Operation of the system in the tilt-forward mode is obtained by actuation of the tilt control lever 34 with accelerator pedal released so as to operate the pump in the low speed range. This mode of operation is the same as described above with reference to FIG. 15. The operation of the system in the tilt-backward mode is the same as described above with reference to FIG. 12.

Operation of the lift truck in the auxiliary mode is obtained by actuation of the auxiliary control lever 36 and depressing the accelerator pedal to operate the pump in the intermediate speed range. This operating mode is the same as described above with reference to FIG. 16.

Although the description of this invention has been given with reference to a particular embodiment, it is not to be construed in the limiting sense. Many variations and modifications will now occur to those skilled in the art. For a definition of the invention, reference is made to the appended claims.

What is claimed is:

1. In a work vehicle of the type having at least first and second hydraulic load circuits,
   first and second manually actuable selector means operatively coupled with said first and second load circuits respectively for selecting operation of circuits individually or together, said second circuit having a greater hydraulic flow requirement than said first circuit,
   a positive displacement hydraulic pump,
   a changeable speed prime mover connected with the pump and adapted to operate in a speed range between a low speed and a high speed,
   manually actuable speed control means operatively coupled with said prime mover for changing the speed thereof to change the flow from the pump in accordance with the requirements of the load circuits,
   said pump being adapted to supply the flow required by the first load circuit when the prime mover is operated at said low speed and to supply the flow required by the second load circuit when the prime mover is operated at said high speed,
   the improvement comprising:
   a priority demand valve having an inlet port connected with the pump, a primary outlet port connected with the first load circuit, a secondary outlet port connected with the second load circuit, and normally closed valve means between the inlet port and the secondary outlet port,
   said priority demand valve including means for supplying to the primary outlet port all of the flow required by the first load circuit when the selector means are actuated individually or together with the pump running at any speed in said speed range,
   said priority demand valve including means for opening said valve means when the inlet flow exceeds that required by the first load circuit with said first and second selector means actuated together and with said pump running at any speed within said speed range,
   and means for diverting the excess flow from the primary outlet port to the secondary outlet port, whereby the inlet flow in excess of that required by the first load circuit is supplied to the secondary outlet and thence to the second load circuit.

2. The invention as defined in claim 1,
   wherein said last-mentioned means comprises bypass means operative to permit flow from the primary outlet port to the secondary outlet port around said valve means when the pressure in the second load circuit is less than that in the first load circuit whereby the inlet flow in excess of that required by the first load circuit is supplied to the second load circuit.

3. The invention as defined in claim 1 wherein said vehicle has three hydraulic load circuits,
a third manually actuable selector means operatively coupled with the third load circuit, said third load circuit having a hydraulic flow requirement intermediate that of the first and second circuits,
said speed control means being operable to operate said prime mover at an intermediate speed when the third selector means is actuated,
said pump being adapted to supply the flow required by the third load circuit when the prime mover is operated at said intermediate speed,
said secondary outlet port of the priority demand valve being connected to the third load circuit,
whereby the inlet flow in excess of that required by the first load circuit is supplied to the secondary outlet port and thence to second and third load circuits.

4. The invention as defined in claim 3 including:
pressure relief valve means coupled with said second and third hydraulic load circuits and being adapted to limit the pressure in said second load circuit to a first predetermined value and being adapted to limit the pressure in said third load circuit to a second predetermined value.

5. The invention as defined in claim 4 wherein, said pressure relief valve means comprises:
a main relief valve having an inlet port connected with the secondary outlet port of said priority demand valve and having an outlet port connected with a return line,
a pressure sensing line coupled with the second and third load circuits,
first and second pilot relief valves each having respective inlet ports connected with said pressure sensing line and having respective outlet ports connected with said return line,
said first pilot relief valve being coupled with the main relief valve and being responsive to a pressure value in excess of said first predetermined value for opening the main relief valve,
said second pilot relief valve being coupled with said main relief valve and being responsive to a pressure value in excess of said second predetermined value for opening said main relief valve.

6. The invention as defined in claim 5 including:
a first flow control valve including a first flow restrictor connected between the secondary outlet port of the priority demand valve and the inlet port of said third control valve,
a second flow control valve including a second flow restrictor connected between the secondary outlet port of said priority demand valve and the inlet port of said fourth control valve,
said pressure sensing line being coupled with said third load circuit at a point between said first flow restrictor and said inlet port of the third control valve,
said pressure sensing line being coupled with said fourth load circuit at a point between said second flow restrictor and said fourth control valve.

7. The invention as defined in claim 3 including:
a flow control valve connected between the secondary outlet port of the priority demand valve and the third load circuit.

8. The invention as defined in claim 1 wherein, said work vehicle is a lift truck,
said first hydraulic load circuit is a power steering circuit,
and said second hydraulic load circuit is a lift circuit.

9. The invention as defined in claim 1 wherein, said prime mover is an electric motor,
and said speed control means is operatively coupled with said selector means for actuation concomitantly therewith.

10. The invention as defined in claim 1 wherein, said prime mover is an internal combustion engine,
and said speed control means comprises a manually actuated throttle of said engine.

11. The invention as defined in claim 1 wherein, said means for opening said valve means comprises fluid pressure responsive means for opening said valve means when the pressure in the first load circuit is less than that in the second load circuit.

12. In a work vehicle of the type having at least two hydraulic load circuits,
one of said circuits including a first control valve and a first hydraulic motor operatively connected with a first utilization device and adapted to be energized in response to actuation of the first control valve,
another of said circuits including a second control valve, and a second hydraulic motor operatively connected with a second utilization device and adapted to be energized in response to actuation of the second control valve,
a positive displacement hydraulic pump,
a changeable speed prime mover connected with the pump,
said second hydraulic motor being operable at a higher value of hydraulic flow than said first hydraulic motor,
said pump being adapted to supply the hydraulic flow required by the second hydraulic motor when the prime mover is operated in a high speed range and to supply the flow required by the first hydraulic motor when the prime mover is operated in a low speed range,
a priority demand valve having an inlet port connected with said pump, a primary outlet port, a secondary outlet port and a normally closed valve means between the inlet port and the secondary outlet port,
the first control valve having an inlet port connected with the primary outlet port,
the second control valve having an inlet port connected with the secondary outlet port,
and speed control means operatively coupled with said prime mover for causing the prime mover to operate in said low speed range when only the first control valve is actuated and to operate in said high speed range when only the second control valve is actuated and when both control valves are actuated together,
said priority demand valve including means for supplying to the primary outlet port all of the flow required by the first hydraulic motor when the first and second control valves are actuated individually or together,
said priority demand valve including means for opening said valve means when the inlet flow exceeds that required by the first hydraulic motor when said first and second control valves are actuated together, and means for diverting the excess flow from the primary outlet port to the secondary outlet port, whereby the inlet flow in excess of that required by the first hydraulic motor is supplied to the secondary outlet and thence to the second hydraulic motor.

13. The invention as defined in claim 12 wherein said last mentioned means comprises,
bypass means operative to permit flow from the primary outlet port to the secondary outlet port around said valve means when the pressure in the second load circuit is less than that in the first load circuit whereby the inlet flow in excess of that required by the first load circuit is supplied to the second load circuit.

14. The invention as defined in claim 13 wherein said vehicle has three hydraulic load circuits,
the third of said circuits including a third control valve, a third hydraulic motor operatively connected with a third utilization device and adapted to be energized in response to actuation of the third control valve,
said third hydraulic motor being operable at a value of hydraulic flow intermediate that of first and second hydraulic motors,
said pump being adapted to supply the hydraulic flow required by the third hydraulic motor when the prime mover is operated in an intermediate speed range,
the third control valve having an inlet port connected with said secondary outlet port,
said speed control means being adapted for causing the drive motor to operate in said intermediate speed range when only the third control valve is actuated and when the third and first control valves are actuated together.

15. The invention as defined in claim 14 wherein,
said work vehicle includes a fourth hydraulic load circuit which is a tilt circuit,
said fourth circuit including a fourth control valve, a fourth hydraulic motor operatively connected with a fourth utilization device and adapted to be energized in response to actuation of the fourth control valve,
said fourth hydraulic motor being operable at a hydraulic flow about the same as the first hydraulic motor,
said speed control means being adapted for causing the prime mover to operate in said low speed range when only the fourth control valve is actuated and when the first and fourth control valves are actuated together.

16. The invention as defined in claim 15 including:
a first flow control valve connected between said secondary outlet port of the priority demand valve and the inlet port of the third control valve, and a second flow control valve connected between said secondary outlet port of the priority demand valve and the inlet port of the fourth control valve.

17. The invention as defined in claim 14 including:
a flow control valve connected between the secondary outlet port of the priority demand valve and the inlet port of the third control valve.

18. The invention as defined in claim 7, 17 or 16 wherein each of said flow control valves comprises a flow restrictor.

19. The invention as defined in claim 12 wherein,
said work vehicle is a lift truck,
said first hydraulic load circuit is a power steering circuit,
and said second hydraulic load circuit is a lift circuit.

20. For use in a hydraulic system having a pump and having first and second hydraulic load circuits, the second load circuit being adapted for operation at higher pressure than the first load circuit,
a priority demand valve having an inlet port adapted to be connected with the pump, a primary outlet port adapted to be connected with the first load circuit, a secondary outlet port adapted to be connected with the second load circuit, and normally closed valve means between the inlet port and the secondary outlet port,
flow rate responsive means urging said valve means toward opening in response to inlet flow,
pressure responsive means for urging said valve means toward opening when the pressure in the first load circuit exceeds a predetermined value,
and means for diverting the excess flow from the primary outlet port to the secondary outlet port,
said valve means being opened in response to the inlet flow or the pressure in the first load circuit or the combination thereof whereby the flow required by the first load circuit has priority and the inlet flow in excess of that required by the first load circuit is supplied to the second load circuit.

21. The invention as defined in claim 20 wherein said last mentioned means comprises,
bypass means operative to permit flow from the primary outlet port to the secondary outlet port when the pressure in the second load circuit is less than the pressure in the first load circuit.

22. The invention as defined in claim 21 wherein said by-pass means includes a check valve.

23. The invention as defined in claim 20 wherein said flow rate responsive means comprises:
a first flow restricting means connected between the inlet port and the primary outlet port,
and a pressure sensing means coupled between the flow restricting means and the valve means whereby the valve means is opened in response to a predetermined value of pressure differential across the restricting means.

24. The invention as defined in claim 20 wherein,
said pressure responsive means comprises a pressure relief valve connected with the primary outlet port and in series with a second flow restricting means whereby only a limited flow is required to produce a sufficient change of pressure across the first flow restricting means to open said valve means.

* * * * *